United States Patent
Fernandez-Corbaton et al.

(10) Patent No.: US 8,391,389 B2
(45) Date of Patent: Mar. 5, 2013

(54) MIMO DETECTION WITH ON-TIME SYMBOL LEVEL INTERFERENCE CANCELLATION

(75) Inventors: Ivan Jesus Fernandez-Corbaton, Nuernberg (DE); Josef J. Blanz, Wachenheim (DE); Christoph Arnold Joetten, Wadern (DE)

(73) Assignee: QUALCOMM Incorporated, San Diego, CA (US)

( * ) Notice: Subject to any disclaimer, the term of this patent is extended or adjusted under 35 U.S.C. 154(b) by 993 days.

(21) Appl. No.: 11/934,916

(22) Filed: Nov. 5, 2007

(65) Prior Publication Data
US 2008/0219374 A1 Sep. 11, 2008

Related U.S. Application Data

(60) Provisional application No. 60/864,557, filed on Nov. 6, 2006.

(51) Int. Cl.
*H04B 7/02* (2006.01)
(52) U.S. Cl. ........ 375/267; 375/260; 375/232; 375/350; 370/335; 370/342
(58) Field of Classification Search .................. 375/267
See application file for complete search history.

(56) References Cited

U.S. PATENT DOCUMENTS

| | | | |
|---|---|---|---|
| 6,584,115 B1 | 6/2003 | Suzuki | |
| 2002/0018454 A1 | 2/2002 | Misra et al. | |
| 2002/0051433 A1* | 5/2002 | Affes et al. | 370/335 |
| 2004/0062302 A1* | 4/2004 | Fujii et al. | 375/232 |
| 2005/0239509 A1* | 10/2005 | Li et al. | 455/562.1 |
| 2006/0155533 A1 | 7/2006 | Lin et al. | |
| 2007/0195865 A1 | 8/2007 | Joetten | |

FOREIGN PATENT DOCUMENTS

| | | |
|---|---|---|
| CN | 1358355 A | 7/2002 |
| EP | 1353452 A2 | 10/2003 |
| JP | 2000013360 | 1/2000 |
| JP | 2002026871 A | 1/2002 |
| RU | 2238611 | 10/2004 |
| RU | 2003135853 | 4/2005 |

(Continued)

OTHER PUBLICATIONS

Ivan Fernandez I Corbaton, Initial version, Sep. 23, 2005. Revision 1, Jun. 2, 2006. "On the Optimality of the Bipartite Linear receiver for MIMO-CDM" Qualcomm Nurnberg. MIMO-CDMA project.

(Continued)

*Primary Examiner* — Lihong Yu
(74) *Attorney, Agent, or Firm* — Howard H. Seo

(57) ABSTRACT

Techniques for receiving a MIMO transmission are described. A receiver processes received data for the MIMO transmission based on a front-end filter to obtain filtered data. The receiver further processes the filtered data based on at least one first combiner matrix to obtain detected data for a first frame. The receiver demodulates and decodes this detected data to obtain decoded data for the first frame. The receiver then processes the filtered data based on at least one second combiner matrix and the decoded data for the first frame to cancel interference due to the first frame and obtain detected data for a second frame. The receiver processes this detected data to obtain decoded data for the second frame. The front-end filter processes non on-time signal components in the received data. Each combiner matrix combines on-time signal components in the filtered data to obtain detected data for a channelization code.

24 Claims, 8 Drawing Sheets

FOREIGN PATENT DOCUMENTS

| | | |
|---|---|---|
| WO | 0101595 A | 1/2001 |
| WO | WO02093784 A1 | 11/2002 |
| WO | 2005099155 A | 10/2005 |
| WO | 2007111718 A | 10/2007 |

OTHER PUBLICATIONS

Qualcomm Nurnberg. MIMO-CDMA project, "System Level Performance of full and simplified Successive Interference Cancellation for MIMO-WCDMA" Jul. 13th 2006, First Revision, Sep. 20, 2006.
International Search Report—PCT/US07/083659, International Search Authority—European Patent Office—Apr. 11, 2008.
Written Opinion—PCT/US07/083659, International Search Authority—European Patent Office—Apr. 11, 2008.
Borgo, Marco et.al, "A Novel Low Complexity Space-Time Receiver for MIMO Systems Based on Beamforming and Partial SIC," Vehicular Technology Conference, 2005. VTC 2005-Spring., Jun. 1, 2005, vol. 2, pp. 1196-1200.
Peng, Yue-xing, et al., "Asynchronous DS-CDMA system is equivalent to simultaneous multi-user detection algorithm", Journal of Circuits and Systems, vol. 8, No. 6, Dec. 2003, pp. 39-43.
Petre, et.al, "Combined Space-Time Chip Equalization and Parallel Interference Cancellation for DS-CDMA Downlink with Spatial Multiplexing," Personal, Indoor and Mobile Radio Communications, 2002., Sep. 18, 2002, vol. 3, pp. 1117-1121.
Kawamoto J., et al., "Maximum Likelihood Detection Based on Replica Candidate Selection with QR Decomposition Employing Multipath Interference Canceller with Two-Dimensional MMSE for Broadband DS-CDMA", Technical Report of the Institute of Electronics, Information and Communication Engineers, Apr. 16, 2004, vol. 104, No. 22, pp. 19-24, RCS2004-27.
Taiwan Search Report—TW096141950—TIPO—Mar. 2, 2012.

* cited by examiner

MIMO DETECTION WITH ON-TIME SYMBOL LEVEL INTERFERENCE CANCELLATION

I. CLAIM OF PRIORITY UNDER 35 U.S.C. §119

The present application for patent claims priority to Provisional Application Ser. No. 60/864,557, entitled "Ontime Symbol Level Interference Cancellation," filed Nov. 6, 2006, assigned to the assignee hereof, and expressly incorporated herein by reference.

BACKGROUND

I. Field

The present disclosure relates generally to communication, and more specifically to techniques for receiving a multiple-input multiple-output (MIMO) transmission.

II. Background

A MIMO transmission is a transmission from multiple (M) transmit antennas to multiple (N) receive antennas. For example, a transmitter may simultaneously transmit M data streams from the M transmit antennas. These data streams are distorted by the wireless environment and further degraded by noise and interference. A receiver receives the transmitted data streams via the N receive antennas. The received signal from each receive antenna contains scaled and delayed versions of the transmitted data streams. The transmitted data streams are thus dispersed among the N received signals from the N receive antennas. The receiver may then process the N received signals with a space-time equalizer to recover the transmitted data streams.

The receiver may dynamically derive coefficients for the space-time equalizer to account for variations in signal properties. These signal properties may relate to channel and interference statistics, spatio-temporal processing of the transmitted data streams, etc. The derivation of the equalizer coefficients is computationally intensive. Updating these equalizer coefficients to match the fastest changes in the signal properties may result in a very complex receiver. Updating these equalizer coefficients at a slower rate may result in performance degradation.

There is therefore a need in the art for techniques to efficiently receive a MIMO transmission.

SUMMARY

Techniques for receiving a MIMO transmission with successive interference cancellation (SIC) are described herein. A receiver may obtain received data for a MIMO transmission comprising multiple frames. Each frame may be encoded separated by a transmitter and may be decoded separated by the receiver. In one design, the receiver may process the received data based on a front-end filter to obtain filtered data. The receiver may further process the filtered data based on at least one first combiner matrix to obtain detected data for a first frame. The receiver may process (e.g., demodulate and decode) the detected data for the first frame to obtain decoded data for the first frame. The receiver may then process the filtered data based on at least one second combiner matrix and the decoded data for the first frame to cancel interference due to the first frame and obtain detected data for a second frame. The receiver may process the detected data for the second frame to obtain decoded data for the second frame.

The front-end filter may process non on-time signal components in the received data to obtain the filtered data. Each combiner matrix may combine on-time signal components in the filtered data for a different channelization code to obtain detected data for the channelization code. The on-time and non on-time signal components may be distinguished based on transmit time. At the receiver, the on-time signal components may comprise signal components tracing back to a desired symbol to be recovered as well as other symbols transmitted at the same time as the desired symbol. The non on-time signal components may comprise signal components that are not on-time signal components, such as signal components tracing back to other symbols transmitted before and after the desired symbol.

The combiner matrices may be functions of data-specific processing at the transmitter. The data-specific processing may be based on channelization codes, transmit matrices, gains, etc. A single front-end filter may be derived and used for all channelization codes whereas a different combiner matrix may be derived for each channelization code.

For on-time SIC, interference due to on-time signal components of the first frame may be estimated and canceled from the filtered data. The front-end filter may process the received data once to obtain the filtered data, and a different set of combiner matrices may be derived for each frame and used to combine the filtered data to obtain the detected data for that frame. For full SIC, interference due to the first frame for an entire time span of the front-end filter may be estimated and canceled from the received data to obtain input data. The front-end filter may be updated for the second frame, and the input data may be processed with the updated front-end filter to obtain filtered data for the second frame. A different set of combiner matrices may be derived for each frame and used to combine the filtered data for that frame to obtain the detected data for the frame Received signal quality of the first frame may be estimated based on a transmit matrix for the first and second frames and an assumption of no cancellation of interference from any frame. The received signal quality of the second frame may be estimated based on a modified transmit matrix having a column corresponding to the first frame set to zero and an assumption of cancellation of interference due to the on-time signal components of the first frame.

Various aspects and features of the disclosure are described in further detail below.

DETAILED DESCRIPTION

The receiver processing techniques described herein may be used for various communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc. A CDMA system utilizes code division multiplexing (CDM) and transmits modulation symbols in parallel using different channelization codes. A CDMA system may implement a radio technology such as Wideband-CDMA (W-CDMA), cdma2000, etc. cdma2000 covers IS-2000, IS-856, and IS-95 standards. A TDMA system may implement a radio technology such as Global System for Mobile Communications (GSM). W-CDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available. An OFDMA system utilizes orthogonal frequency division multiplexing (OFDM) and transmits modulation symbols in the frequency domain on orthogonal subcarriers. An SC-FDMA system utilizes single-carrier frequency division multiplexing (SC-FDM) and transmits modulation symbols in the time domain on orthogonal subcarriers.

The techniques described herein may also be used for MIMO transmissions on the downlink as well as the uplink. The downlink (or forward link) refers to the communication link from base stations to wireless devices, and the uplink (or reverse link) refers to the communication link from the wireless devices to the base stations. For clarity, the techniques are described below for a MIMO transmission in a CDMA system, which may implement W-CDMA, cdma2000, or some other CDMA radio technology.

Figure 1:
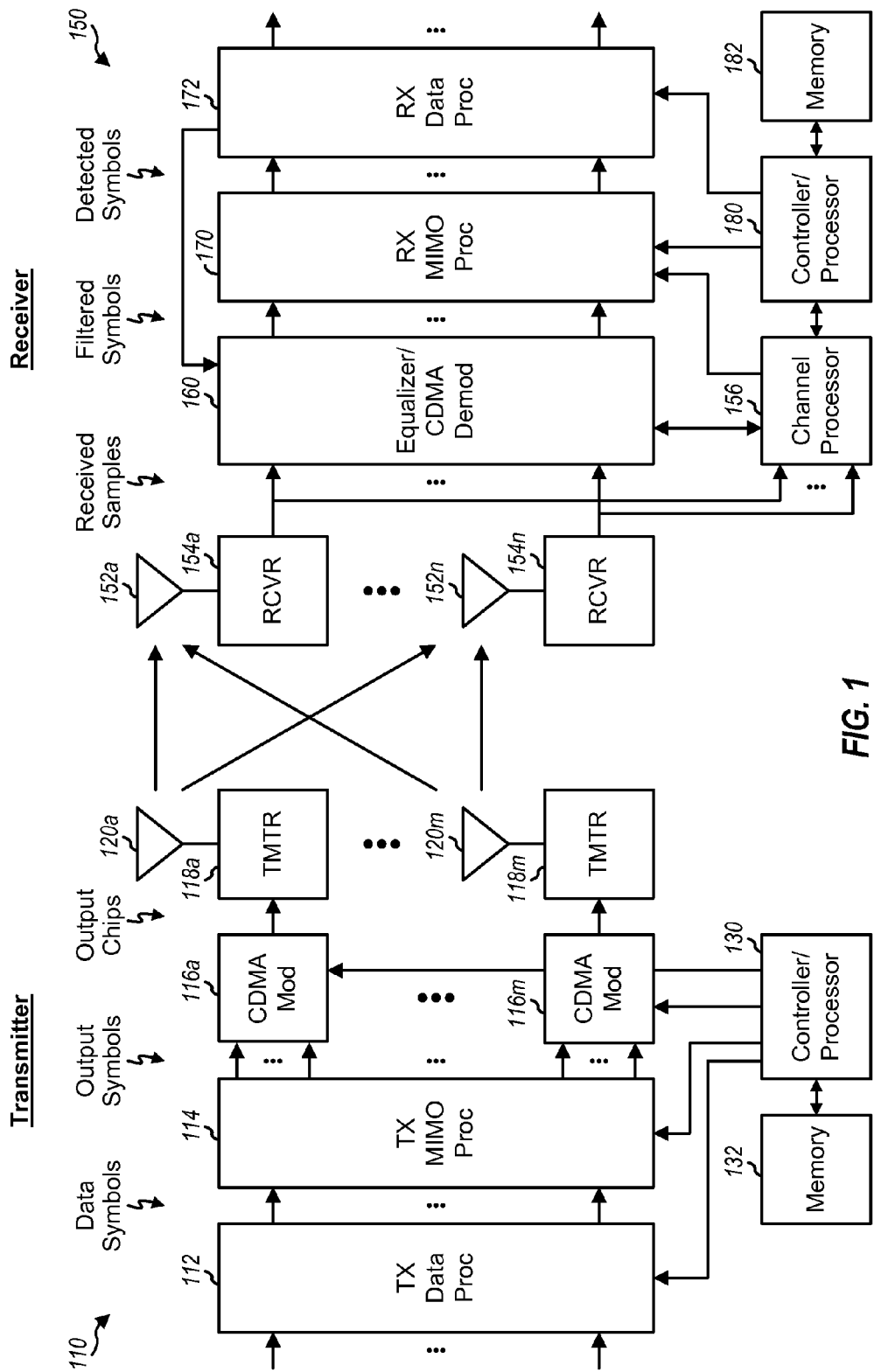
FIG. 1 shows a block diagram of a transmitter and a receiver.

FIG. 1 shows a block diagram of a transmitter 110 and a receiver 150 for a MIMO transmission. For downlink transmission, transmitter 110 is part of a base station, and receiver 150 is part of a wireless device. For uplink transmission, transmitter 110 is part of a wireless device, and receiver 150 is part of a base station. A base station is typically a fixed station that communicates with the wireless devices and may also be called a Node B, an evolved Node B, an access point, etc. A wireless device may be stationary or mobile and may also be called a user equipment (UE), a mobile station, a terminal, a station, a subscriber unit, etc. A wireless device may be a cellular phone, a personal digital assistant (PDA), a wireless modem, a laptop computer, a handheld device, etc.

At transmitter 110, a transmit data processor (TX Data Proc) 112 receives traffic data and signaling, processes (e.g., encodes, interleaves, and symbol maps) the received data, and provides data symbols. Processor 112 also generates and multiplexes pilot symbols with the data symbols. As used herein, a data symbol is a symbol for traffic data or signaling, a pilot symbol is a symbol for pilot, and a symbol is typically a complex value. The data symbols and pilot symbols may be modulation symbols from a modulation scheme such as PSK or QAM. Pilot is data that is known a priori by both the transmitter and receiver. A TX MIMO processor 114 performs spatial or spatio-temporal processing on the data and pilot symbols as described below and provides output symbols to multiple (M) CDMA modulators 116a through 116m. Each CDMA modulator 116 processes its output symbols as described below and provides output chips to an associated transmitter unit (TMTR) 118. Each transmitter unit 118 processes (e.g., converts to analog, amplifies, filters, and frequency upconverts) its output chips and generates a modulated signal. M modulated signals from M transmitter units 118a through 118m are transmitted from M antennas 120a through 120m, respectively.

At receiver 150, multiple (N) antennas 152a through 152n receive the transmitted signals via various propagation paths in the wireless environment and provide N received signals to N receiver units (RCVR) 154a through 154n, respectively. Each receiver unit 154 processes (e.g., filters, amplifies, frequency downconverts, and digitizes) its received signal and provides received samples to a channel processor 156 and an equalizer/CDMA demodulator 160. Processor 156 derives coefficients for a front-end filter/equalizer and coefficients for one or more combiner matrices as described below. Unit 160 performs equalization on the received samples with the front-end filter, performs CDMA demodulation on the filtered samples, and provides filtered symbols. A receive (RX) MIMO processor 170 combines the filtered symbols across spatial dimension and provides detected symbols, which are estimates of the transmitted data symbols. An RX data processor 172 processes (e.g., symbol demaps, deinterleaves, and decodes) the detected symbols and provides decoded data. In general, the processing by equalizer/CDMA demodulator 160, RX MIMO processor 170, and RX data processor 172 is complementary to the processing by CDMA modulator 116, TX MIMO processor 114, and TX data processor 112, respectively, at transmitter 110.

Controllers/processors 130 and 180 direct operation of various processing units at transmitter 110 and receiver 150, respectively. Memories 132 and 182 store data and program codes for transmitter 110 and receiver 150, respectively.

Figure 2:
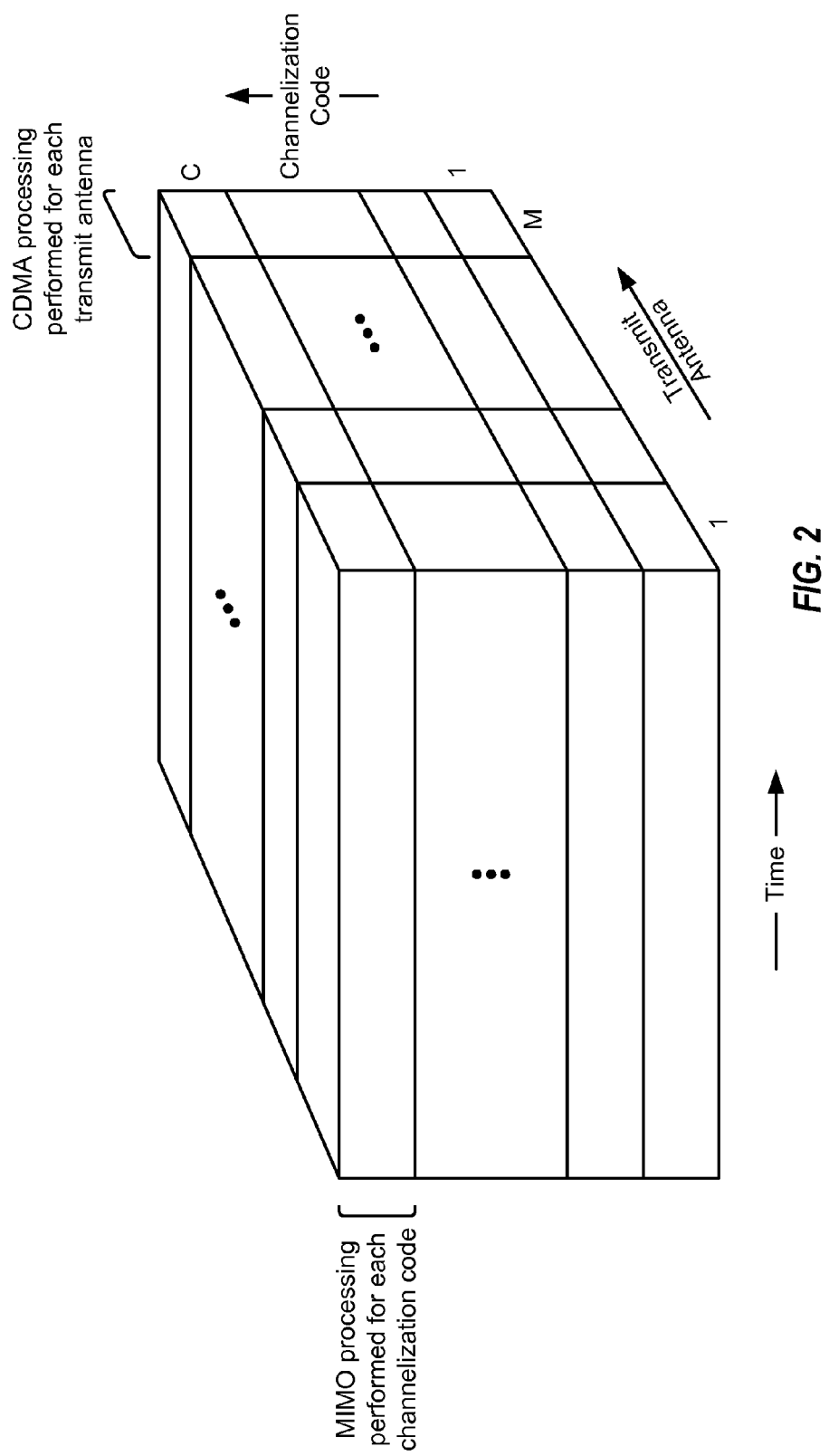
FIG. 2 illustrates a MIMO-CDM transmission.

FIG. 2 illustrates a MIMO-CDM transmission. For CDM, up to C symbols may be sent simultaneously via one transmit antenna with C channelization codes, where in general $C \geq 1$. These channelization codes may be orthogonal variable spreading factor (OVSF) codes in W-CDMA, Walsh codes in cdma2000, other orthogonal codes or quasi-orthogonal codes, pseudo-random codes, etc. Each channelization code is a specific sequence of chips. The number of chips in the sequence is the length or spreading factor of the channelization code. In general, any set of one or more channelization codes may be used for each transmit antenna, and the channelization codes may have the same or different spreading factors. For simplicity, the following description assumes that the channelization codes have the same spreading factor. The same set of C channelization codes may be reused for each of the M transmit antennas. For MIMO, up to M symbols may be sent simultaneously via M transmit antennas. For MIMO-CDM, up to C•M symbols may be sent simultaneously via M transmit antennas with C channelization codes. MIMO processing may be performed separately for each of the C channelization codes. MIMO processing is performed across all M transmit antennas for each channelization code. CDM processing may be performed separately for each of the M transmit antennas. CDM processing is performed for all C channelization codes for each transmit antenna.

Figure 3:
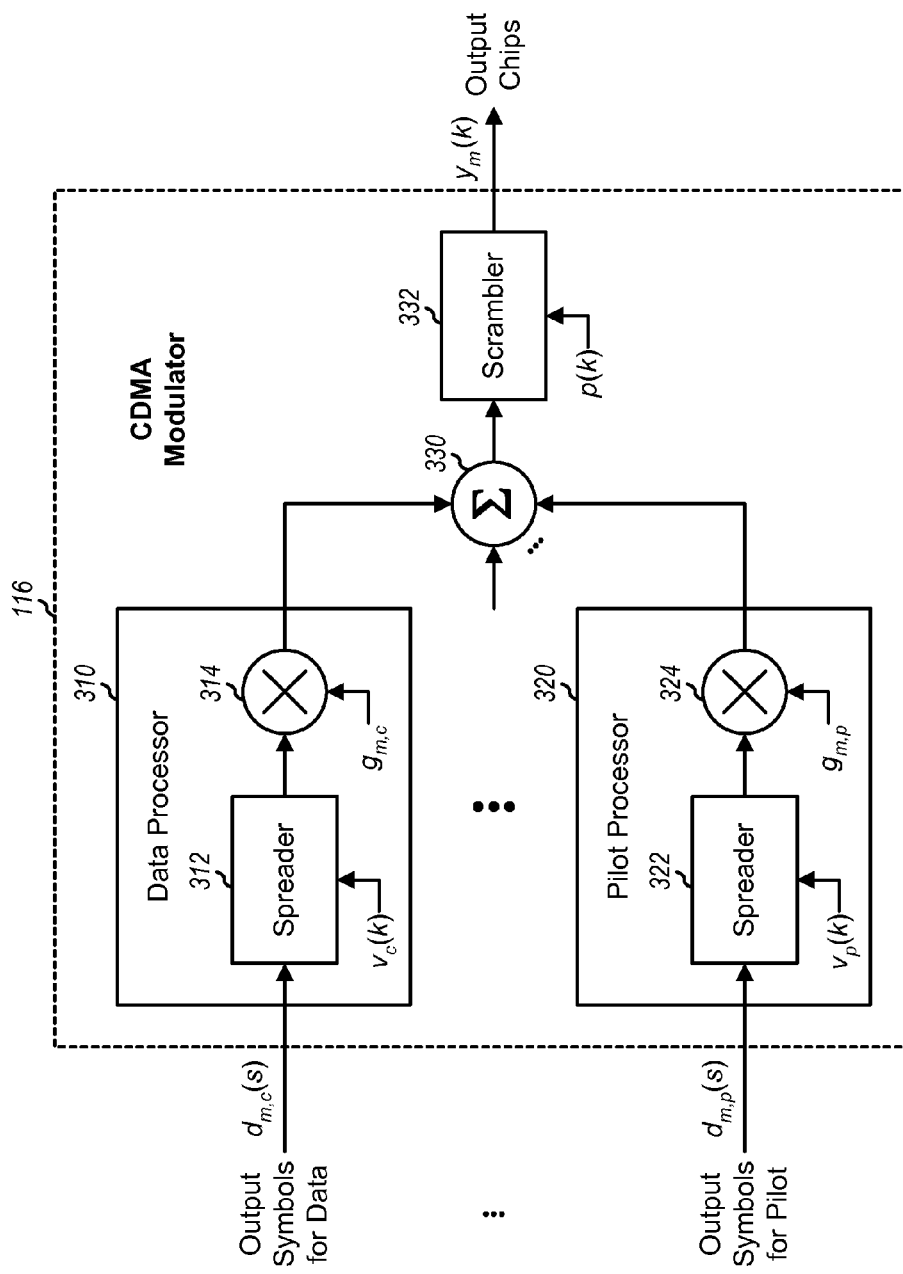
FIG. 3 shows a block diagram of a CDMA modulator at the transmitter.

FIG. 3 shows a block diagram of a CDMA modulator 116 for one transmit antenna m, where $m \in \{1, \ldots, M\}$. CDMA modulator 116 may be used for each of CDMA modulators 116a through 116m in FIG. 1. CDMA modulator 116 includes a data processor 310 for each channelization code used for traffic data and/or signaling and a pilot processor 320 for pilot.

Within data processor 310, a spreader 312 spreads output symbols $d_{m,c}(s)$ for data with channelization code c having a chip sequence of $v_c(k)$, where s is symbol index and k is chip index. A multiplier 314 scales the output of spreader 312 with a gain $g_{m,c}$ and provides data chips for channelization code c. Within pilot processor 320, a spreader 322 spreads output symbols $d_{m,p}(s)$ for pilot with channelization code p for pilot. A multiplier 324 scales the output of spreader 322 with a gain $g_{m,p}$ and provides pilot chips. The gains $g_{m,c}$ and $g_{m,p}$ determine the amount of transmit power used for channelization code c and pilot, respectively. A summer 330 sums the data and pilot chips for all channelization codes. A scrambler 332 multiplies the output of summer 330 with a scrambling sequence p(k) for transmitter 110 and provides output chips $y_m(k)$ for transmit antenna m.

In general, any number and any ones of the C channelization codes may be used for each of the M transmit antennas. In one design, the same channelization code is used for pilot for all M transmit antennas. In another design, M channelization codes are used for pilot for the M transmit antennas, and the remaining C−M channelization codes may be reused for each of the M transmit antennas. The same scrambling sequence may be used for all M transmit antennas, as shown in FIG. 3. Alternatively, a different scrambling sequence may be used for each transmit antenna. The spreading and scrambling may also be performed in other manners.

A MIMO channel is formed by the propagation environment between the M transmit antennas at transmitter 110 and the N receive antennas at receiver 150. L data symbols may be sent in parallel from the M transmit antennas for each channelization code, where $1 \leq L \leq \min\{M, N\}$. Receiver 150 may evaluate the performance (e.g., throughput) of the MIMO channel for different values of L (and possibly different transmit matrices/vectors) and may select the L value (and the transmit matrix/vector) that achieves the best performance.

Transmitter 110 may perform transmitter spatial processing for each channelization code c in each symbol period s, as follows:

$$\underline{d}_c(s) = \underline{B}_c \underline{b}_c(s), \text{ for } c=1, \ldots, C, \qquad \text{Eq (1)}$$

where $\underline{b}_c(s) = [b_{1,c}(s)\ b_{2,c}(s)\ \ldots\ b_{L,c}(s)]^T$ is an L×1 vector of data symbols, $\underline{B}_c$ is an M×L transmit matrix for channelization code c, $\underline{d}_c(s) = [d_{1,c}(s)\ d_{2,c}(s)\ \ldots\ d_{M,c}(s)]^T$ is an M×1 vector of output symbols, and "$T$" denotes a transpose.

Each element of $\underline{b}_c(s)$ may correspond to a different data stream. The data streams may have different gains, in which case matrix $\underline{B}_c$ may have different column norms for different data streams. Equation (1) shows spatial encoding with $\underline{B}_c$. Spatio-temporal encoding such as, e.g., space-time transmit diversity (STTD) may also be performed but is not shown in equation (1).

Different transmit matrices may be used for different MIMO modes such as closed loop transmit diversity (CLTD), per antenna rate control (PARC), code reuse Bell Labs layered space-time (CRBLAST), double-transmit adaptive array (D-TXAA), etc. Table 1 lists some MIMO modes and, for each mode, gives L, M, $\underline{B}_c$ and the source of the data symbols. In Table 1, $\underline{B}_{cltd}$ may be a 2×1 vector selected from the set $\{[1\ e^{j\pi/4}]^T, [1\ e^{-j3\pi/4}]^T, [1\ e^{j3\pi/4}]^T, [1\ e^{-j\pi/4}]^T\}$. $\underline{B}_{d-txaa}$ may be a 2×2 matrix selected from the set $$\left\{ \begin{bmatrix} 1 & 1 \\ e^{j\pi/4} & e^{-j3\pi/4} \end{bmatrix}, \begin{bmatrix} 1 & 1 \\ e^{j3\pi/4} & e^{-j\pi/4} \end{bmatrix} \right\}.$$

I is an identity matrix with ones along the diagonal and zeros elsewhere.

TABLE 1

| MIMO Mode | L | M | $B_c$ | Source of Data Symbols |
|---|---|---|---|---|
| CLTD | 1 | 2 | $B_c = B_{cltd}$ | From a single encoded frame. |
| PARC | L = M | ≥2 | $B_c = I$ | From L different encoded frames. |
| CRBLAST | L = M | ≥2 | $B_c = I$ | From a single encoded frame. |
| D-TXAA | L = M | =2 | $B_c = B_{d-txaa}$ | From up to L encoded frames. |

A frame may also be referred to as a packet, a transport block, a data block, a codeword, a stream, a data stream, a spatial stream, etc. A frame may be encoded separated by transmitter 110 and decoded separated by receiver 150.

Transmitter 110 may perform CDMA processing for each transmit antenna m in each symbol period s, as follows:

$$y_m(k) = \left( \sum_{c=1}^{C} g_{m,c} \cdot v_c(k \bmod C) \cdot d_{m,c}(k \operatorname{div} C) \right) \cdot p(k), \qquad \text{Eq (2)}$$

for $m = 1, \ldots, M$, where symbol period s corresponding to chip period k is given by $s = k \operatorname{div} C = \lfloor k/C \rfloor$. The gain $g_{m,c}$ may be set equal to zero for each channelization code that is not used.

If channelization codes with different spreading factors are used, then the CDMA processing for transmit antenna m may be expressed as:

$$y_m(k) = \left( \sum_{c=1}^{N_{pc}} g_{m,c} \cdot v_c(k \bmod C_c) \cdot d_{m,c}(k \operatorname{div} C_c) \right) \cdot p(k),$$

where $C_c$ is the spreading factor of channelization code c, and $N_{pc}$ is the number of channelization codes used for transmit antenna m.

For simplicity, the following description assumes that channelization codes with spreading factor of C is used for each transmit antenna. In equation (2), output symbol $d_{m,c}(s)$ is spread with channelization code c having spreading factor C and scaled by gain $g_{m,c}$ to obtain data chips. The spreading is achieved by replicating the output symbol C times and multiplying the C replicated output symbols with the C chips of channelization code c. The data and pilot chips for all C channelization codes are summed and further scrambled with scrambling sequence p(k) to obtain output chips $y_m(k)$ for transmit antenna m. The same CDMA processing is performed for each of the M transmit antennas.

The received samples at receiver 150 in each chip period k may be expressed as:

$$\underline{x}(k) = \underline{H}\underline{y}(k) + \underline{n}(k), \qquad \text{Eq (3)}$$

where $\underline{y}(k)$ is a T×1 vector of output chips, where T is described below, H is an R×T channel response matrix, where R is described below, $\underline{x}(k)$ is an R×1 vector of received samples, and $\underline{n}(k)$ is an R×1 noise vector.

Receiver 150 may digitize the received signal from each receive antenna at K times the chip rate, where K is an oversampling ratio and in general $K \geq 1$. In each chip period k, receiver 150 may obtain E•K samples from each receiver 154 and form x(k) by stacking N•E•K samples from N receivers 154a through 154n. E is the length of the front-end equalizer at receiver 150, in number of chips. In general, E≧1 and may be selected based on a tradeoff between receiver complexity and performance. x(k) includes R received samples from N receive antennas for E chip periods, where R=N•E•K.

Matrix H contains time-domain channel impulse responses for all transmit and receive antenna pairs. As shown in FIG. 1, there is a propagation channel between each transmit antenna and each receive antenna, or a total of M•N propagation channels between the M transmit antennas and N receive antennas. Each propagation channel has a particular impulse response determined by the wireless environment. The response of a single-input multiple-output (SIMO) channel between each transmit antenna m and the N receive antennas may be given by an R×$T_m$ submatrix $\underline{H}_m$. The number of rows in $\underline{H}_m$ is determined by the number of entries in x(k). The number of columns in $\underline{H}_m$ is determined by the equalizer length E as well as the time span of the impulse responses between transmit antenna m and the N receive antennas. $T_m$ may be given as follows:

$$T_m = \left\lceil E + \max_n \{\ell_{m,n}\} \right\rceil, \quad \text{Eq (4)}$$

where $l_{m,n}$ is the time span of the impulse response between transmit antenna m and receive antenna n, in number of chips, and ⌈ ⌉ denotes a ceiling operator.

Matrix $\underline{H}$ is composed of M submatrices $\underline{H}_m$, for m=1, ..., M, as follows:

$$\underline{H} = [\underline{H}_1 \underline{H}_2 \ldots \underline{H}_M]. \quad \text{Eq (5)}$$

$\underline{H}$ has a dimension of R×T, where T=$T_1$+$T_2$+...+$T_M$.

Vector y(k) is composed of M subvectors $\underline{y}_m$(k), for m=1, ..., M, for the M transmit antennas. Each subvector $\underline{y}_m$(k) includes $T_m$ output chips from one transmit antenna m centered at chip period k. Vector y(k) and subvector $\underline{y}_m$(k) may be expressed as:

$$\underline{y}(k) = \begin{bmatrix} \underline{y}_1(k) \\ \underline{y}_2(k) \\ \vdots \\ \underline{y}_M(k) \end{bmatrix} \quad \text{Eq (6)}$$

and $$\underline{y}_m(k) = \begin{bmatrix} y_m(k - \lfloor T_m/2 - 1 \rfloor) \\ \vdots \\ y_m(k) \\ \vdots \\ y_m(k + \lceil T_m/2 - 1 \rceil) \end{bmatrix}.$$

Equation (3) may also be expressed as:

$$\underline{x}(k) = \sum_{m=1}^{M} \underline{H}_m \underline{y}_m(k) + \underline{n}(k). \quad \text{Eq (7)}$$

For the model shown in equation (7), in each chip period k, $T_m$ output chips are sent from each transmit antenna m and via a SIMO channel with a response of $\underline{H}_m$ to the N receive antennas. The received samples in x(k) include contributions from all M transmit antennas. x(k), y(k), and H may be relatively large. As an example, with M=2, N=2, K=2, E=20, T=48, and R=80, y(k) would be a 48×1 vector, H would be an 80×48 matrix, and x(k) would be an 80×1 vector.

The noise may be assumed to be stationary complex random vector with $$E\{\underline{n}(k)\} = \underline{0}, \text{ and} \quad \text{Eq (8)}$$

$$E\{\underline{n}(k)\underline{n}^H(k)\} = \underline{R}_{nn}, \quad \text{Eq (9)}$$

where E { } is an expectation operation, 0 is a vector of all zeros, $\underline{R}_{nn}$ is an R×R noise covariance matrix, and "$^H$" denotes a conjugate transpose. Equations (8) and (9) indicate that the noise has zero mean and a covariance matrix of $R_{nn}$.

Receiver 150 may recover the data symbols in $\underline{b}_c$(s) for each channelization code c by filtering the received samples in x(k) with a bank of L filters for channelization code c and then despreading and descrambling the filtered samples, as follows:

$$\hat{\underline{b}}_c(s) = \frac{1}{\sqrt{C}} \cdot \sum_{k=sC}^{(s+1)C-1} \underline{W}_c^H \underline{x}(k) \cdot [v_c(k \bmod C) \cdot p(k)]^* \quad \text{Eq (10)}$$

$$= \underline{W}_c^H \left( \frac{1}{\sqrt{C}} \cdot \sum_{k=sC}^{(s+1)C-1} [\underline{H}\underline{y}(k) + \underline{n}(k)] \cdot [v_c(k \bmod C) \cdot p(k)]^* \right)$$

$$= \underline{W}_c^H [\underline{H}\underline{\Theta}_c(s) + \underline{n}_c(s)]$$

$$= \underline{W}_c^H \underline{\chi}_c(s)$$

where $\underline{\Theta}_c(s) = \left( \frac{1}{\sqrt{C}} \cdot \sum_{k=sC}^{(s+1)C-1} \underline{y}(k) \cdot [v_c(k \bmod C) \cdot p(k)]^* \right)$, Eq (11)

$$\underline{n}_c(s) = \left( \frac{1}{\sqrt{C}} \cdot \sum_{k=sC}^{(s+1)C-1} \underline{n}(k) \cdot [v_c(k \bmod C) \cdot p(k)]^* \right), \quad \text{Eq (12)}$$

$$\underline{\chi}_c(s) = \quad \text{Eq (13)}$$

$$\left( \frac{1}{\sqrt{C}} \cdot \sum_{k=sC}^{(s+1)C-1} \underline{x}(k) \cdot [v_c(k \bmod C) \cdot p(k)]^* \right) = \underline{H}\underline{\Theta}_c(s) + \underline{n}_c(s),$$

$\underline{W}_c$ is an R×L overall filter for channelization code c, $\hat{\underline{b}}_c$(s) is an L×1 vector of detected symbols and is an estimate of $\underline{b}_c$(s), and "*" denotes a complex conjugate.

$\underline{\Theta}_c$(s) is a T×1 vector of despread symbols for channelization code c and is obtained based on the transmitted chips. $\underline{n}_c$(s) is an R×1 noise vector for channelization code c after descrambling and despreading. $\underline{n}_c$(s) conserves the statistics of n(k), which are independent of channelization code c. $\underline{\chi}_c$(s) is an R×1 vector of despread symbols for channelization code c and is obtained based on the received samples. $\underline{W}_c$ includes the bank of L filters for channelization code c. Equation (10) indicates that the processing with $\underline{W}_c$ may equivalently be performed on the despread symbols in $\underline{\chi}_c$(s) instead of the received samples in x(k).

Filter $\underline{W}_c$ may be a Weiner filter, which may be derived as:

$$\underline{W}_c = E\{\underline{\chi}_c(s)\underline{\chi}_c^H(s)\}^{-1} \cdot E\{\underline{\chi}_c(s)\underline{b}_c^H(s)\} \quad \text{Eq (14)}$$

$$= \underline{F}\underline{\Delta}_c,$$

where

-continued $$\underline{F} = \underline{\tilde{R}}^{-1}\underline{\tilde{H}},\quad\quad\text{Eq (15)}$$

$$\underline{\Delta}_c = \underline{G}_c\underline{B}_c(I + \underline{B}_c^H\underline{G}_c\underline{\tilde{H}}^H\underline{\tilde{R}}^{-1}\underline{\tilde{H}}\underline{G}_c\underline{B}_c)^{-1},\quad\quad\text{Eq (16)}$$

$$\underline{\tilde{R}} = \underline{H}\underline{\tilde{\Gamma}}\underline{H}^H + \underline{R}_{nn},\quad\quad\text{Eq (17)}$$

$$\underline{\tilde{\Gamma}} = E\{\underline{\Theta}_c(s)\underline{\Theta}_c^H(s)\} - E\{\underline{\Theta}_c(s)\underline{b}_c^H(s)\}E\{\underline{\Theta}_c(s)\underline{b}_c^H(s)\}^H,\quad\quad\text{Eq (18)}$$

$\underline{\tilde{H}}$ is an R×M matrix containing M "on-time" columns of $\underline{H}$, and $\underline{G}_c$ is an M×M gain matrix for channelization code c.

In equation (15), F is a relatively large R×M matrix that is not dependent on channelization code. In equation (16), $\underline{\Delta}_c$ is a small M×L matrix that contains all of the code dependent matrices in $\underline{W}_c$. The derivation of equations (14) through (18) is described in detail in commonly assigned U.S. patent application Ser. No. 11/564,261, entitled "Multi-Stage Receiver for Wireless Communication," filed Nov. 28, 2006.

Equations (10) through (18) indicate that the processing at receiver 150 may be performed in two stages. The first stage filters the received samples x(k) with front-end filter F, which is not dependent on channelization code, and further despreads and descrambles the filtered samples to obtain filtered symbols. A single front-end filter may be used for all channelization codes. The second stage combines the filtered symbols with combiner matrix $\underline{\Delta}_c$ for each channelization code c to obtain detected symbols for that channelization code. The front-end filter and combiner matrices may be updated separately at the same rate or different rates.

The multi-stage receiver processing may be performed in various manners. In the following description, pilot symbols are assumed to be sent with a transmit matrix of $\underline{B}_c$=I and using the same channelization code p for each of the M transmit antennas. The pilot symbols are also assumed to be uncorrelated or orthogonal so that $E\{\underline{b}_p(s)\underline{b}_p^H(s)\}=I$, where $\underline{b}_p(s)$ is an M×1 vector of pilot symbols sent from the M transmit antennas in symbol period s.

In one receiver design, front-end filter F is derived and used for the first stage (e.g., for block 160 in FIG. 1), and combiner matrix $\underline{\Delta}_c$ is computed for each channelization code and used for the second stage (e.g., for block 170 in FIG. 1).

For symbol level training, a filter may be derived based on despread pilot symbols using least squares criterion, as follows:

$$\underline{W}_p = [E\{\underline{\chi}_p(s)\underline{\chi}_p^H(s)\}]^{-1}E\{\underline{\chi}_p(s)\underline{b}_p^H(s)\},\quad\quad\text{Eq (19)}$$

where $\underline{\chi}_p(s)$ is an R×1 vector of despread pilot symbols, and $\underline{W}_p$ is an R×M filter matrix derived based on pilot symbols.

$\underline{W}_p$ may be derived with symbol level training as follows. Despread pilot symbols $\underline{\chi}_p(s)$ may be obtained from the received samples as shown in equation (13), albeit with pilot channelization code p instead of channelization code c. An R×R outer product $\underline{\chi}_p(s)\underline{\chi}_p^H(s)$ may be computed and averaged over a sufficient number of pilot symbols. An R×M outer product $\underline{\chi}_p(s)\underline{b}_p^H(s)$ may also be computed and averaged. $\underline{W}_p$ may then be computed based on the two averaged outer products.

For chip level training, a filter may be derived based on the received samples using the least squares criterion, as follows:

$$\underline{W}_p = [E\{\underline{x}(k)\underline{x}^H(k)\}]^{-1}E\{\underline{x}(k)\underline{b}_p^H(s)\cdot v_p(k)\cdot p(k)\},\quad\quad\text{Eq (20)}$$

where $\underline{b}_p(s)\cdot v_p(k)\cdot p(k)$ is an M×1 vector of pilot chips obtained by spreading and scrambling the pilot symbols.

$\underline{W}_p$ may be derived with chip level training as follows. An R×R outer product $\underline{x}(k)\underline{x}^H(k)$ may be computed based on the received samples and averaged over a sufficient number of pilot symbols. An R×M outer product $\underline{x}(k)\underline{b}_p^H(s)\cdot v_p(k)\cdot p(k)$ may also be computed and averaged. $\underline{W}_p$ may then be computed based on the two averaged outer products. $\underline{W}_p$ may also be derived based on recursive least squares (RLS), block least squares, or some other techniques known in the art.

Front-end filter F may be derived as follows:

$$\underline{F} = \underline{W}_p(I+\underline{P}_p)\underline{G}_p^{-1},\quad\quad\text{Eq (21)}$$

where $$\underline{P}_p = \underline{G}_p\underline{\tilde{H}}^H\underline{\tilde{R}}^{-1}\underline{\tilde{H}}\underline{G}_p,\text{ and}\quad\quad\text{Eq (22)}$$

$\underline{G}_p$ is an M×M gain matrix for the pilot.

Combiner matrix $\underline{\Delta}_c$ may be derived as follows:

$$\underline{\Delta}_c = \underline{G}_c\underline{B}_c(I+\underline{B}_c^H\underline{G}_c\underline{G}_p^{-1}\underline{P}_p\underline{G}_p^{-1}\underline{G}_c\underline{B}_c)^{-1},\quad\quad\text{Eq (23)}$$

As shown in equation (23), combiner matrix $\underline{\Delta}_c$ for each channelization code c may be derived based on $\underline{P}_p$, gain matrices $\underline{G}_p$ and $\underline{G}_c$ for pilot and data, and transmit matrix $\underline{B}_c$ for channelization code c. $\underline{G}_c\underline{G}_p^{-1}$ is also referred to as a traffic-to-pilot ratio and may be known (e.g., via signaling) or estimated by the receiver. It is normally sufficient to estimate the traffic-to-pilot ratio $\underline{G}_c\underline{G}_p^{-1}$, and $\underline{G}_p$ and $\underline{G}_c$ do not need to be estimated separately.

Receiver 150 may recover the data symbols in $\underline{b}_c(s)$ as follows:

$$\hat{\underline{b}}_c(s) = \underline{\Delta}_c^H\left(\frac{1}{\sqrt{C}}\cdot\sum_{k=sC}^{(s+1)C-1}\underline{F}^H\underline{x}(k)\cdot[v_c(k \bmod C)\cdot p(k)]^*\right),\quad\quad\text{Eq (24)}$$

or $$\hat{\underline{b}}_c(s) = \underline{\Delta}_c^H\underline{F}^H\frac{1}{\sqrt{C}}\cdot\sum_{k=sC}^{(s+1)C-1}\underline{x}(k)\cdot[v_c(k \bmod C)\cdot p(k)]^*.\quad\quad\text{Eq (25)}$$

In equation (24), receiver 150 may filter the received samples x(k) with front-end filter F, then despread and descramble the filtered samples for each channelization code c, and then combine the filtered symbols for each channelization code with combiner matrix $\underline{\Delta}_c$. In equation (25), receiver 150 may despread and descramble the received samples for each channelization code c, then filter the despread symbols for each channelization code with front-end filter F, and then combine the filtered symbols for each channelization code c with combiner matrix $\underline{\Delta}_c$.

In another receiver design, $\underline{W}_p$ is used as the front-end filter for the first stage. A combiner matrix $\underline{D}_c$ is computed for each channelization code c and used for the second stage.

The filtered symbols obtained with $\underline{W}_p$ may be expressed as:

$$\underline{z}_c(s) = \underline{W}_p^H\underline{\chi}_c(s)\quad\quad\text{Eq (26)}$$
$$= \underline{A}_c\underline{b}_c(s) + \underline{n}_c(s)$$

where                                                                 Eq (27)

$$\underline{A}_c = \underline{W}_p^H\underline{\tilde{H}}\underline{G}_c\underline{B}_c = \underline{A}_p\underline{G}_p^{-1}\underline{G}_c\underline{B}_c,$$

$$\underline{A}_p = \underline{W}_p^H\underline{\tilde{H}}\underline{G}_p,\text{ and}\quad\quad\text{Eq (28)}$$

$z_c(s)$ is an M×1 vector of filtered symbols for channelization code c.

The data symbols in $\underline{b}_c(s)$ may be obtained as follows:

$$\hat{\underline{b}}_c(s) = \underline{D}_c^H \underline{z}_c(s), \quad \text{Eq (29)}$$

where $\underline{D}_c$ is an M×L combiner matrix for channelization code c.

Combiner matrix $\underline{D}_c$ may be derived based on minimum mean square error (MMSE) criterion, as follows:

$$\underline{D}_c = (\underline{A}_c \underline{A}_c^H + \underline{R}_{nn,c})^{-1} \underline{A}_c, \quad \text{Eq (30)}$$

where $$\underline{R}_{nn,p} = \frac{1}{P} \cdot \sum_{s=s_0C}^{s_0+P-1} \underline{z}_p(s) \underline{z}_p^H(s) - \underline{P}_p \underline{P}_p^H. \quad \text{Eq (31)}$$

As shown in equation (27), M×L matrix $\underline{A}_c$ may be computed for each channelization code c based on (i) matrix $\underline{A}_p$ estimated from pilot symbols or chips and applicable for all channelization codes and (ii) traffic-to-pilot ratio $\underline{G}_p^{-1} \underline{G}_c$ and transmit matrix $\underline{B}_c$ that are specific for channelization code c. As shown in equation (30), combiner matrix $\underline{D}_c$ may be computed for each channelization code c based on (i) noise covariance matrix $\underline{R}_{nn,p}$ that is applicable for all channelization codes and (ii) matrix $\underline{A}_c$ computed for channelization code c.

Combiner matrix $\underline{D}_c$ may also be estimated for each channelization code c as follows:

$$\underline{R}_{zz} = E\left\{\frac{1}{C} \cdot \sum_{c=1}^{C} \underline{z}_c(s) \underline{z}_c^H(s)\right\}, \text{ and} \quad \text{Eq (32)}$$

$$\underline{D}_c = \underline{R}_{zz}^{-1} \underline{A}_c, \quad \text{Eq (33)}$$

where $\underline{R}_{zz}$ is an M×M covariance matrix for $\underline{z}_c(s)$.

Receiver 150 may recover the data symbols in $\underline{b}_c(s)$ as follows:

$$\hat{\underline{b}}_c(s) = \underline{D}_c^H \left(\frac{1}{\sqrt{C}} \cdot \sum_{k=sC}^{(s+1)C-1} \underline{W}_p^H \underline{x}(k) \cdot [v_c(k \bmod C) \cdot p(k)]^*\right), \quad \text{Eq (34)}$$

or $$\hat{\underline{b}}_c(s) = \underline{D}_c^H \underline{W}_p^H \frac{1}{\sqrt{C}} \cdot \sum_{k=sC}^{(s+1)C-1} \underline{x}(k) \cdot [v_c(k \bmod C) \cdot p(k)]^*. \quad \text{Eq (35)}$$

In equation (34), receiver 150 may filter the received samples x(k) with front-end filter $\underline{W}_p$, then despread and descramble the filtered samples for each channelization code c, and then combine the filtered symbols for each channelization code with combiner matrix $\underline{D}_c$. In equation (35), receiver 150 may despread and descramble the received samples for each channelization code c, then filter the despread symbols for each channelization code with front-end filter $\underline{W}_p$, and then combine the filtered symbols for each channelization code c with combiner matrix $\underline{D}_c$.

In both receiver designs described above, the front-end filter F or $\underline{W}_p$ may be considered as an equalizer for the "multipath" dimensions of the received signals. The combiner matrix $\underline{A}_c$ or $\underline{D}_c$ operates on the filtered symbols from the front-end filter and may be considered as adequate processing for the on-time dimensions of the received signals. The receiver processing may also be performed in multiple stages in other manners.

Receiver 150 may estimate received signal quality, which may be quantified by a signal-to-interference-and-noise ratio (SINR) or some other parameter. The detected symbols from equation (29) may be expressed as:

$$\hat{\underline{b}}_c(s) = \underline{D}_c^H \underline{A}_c \underline{b}_c(s) + \underline{D}_c^H \underline{n}_c(s) \quad \text{Eq (36)}$$

$$= \underline{L}_c^H \underline{b}_c(s) + \underline{w}_c(s)$$

where
$\underline{L}_c^H = \underline{D}_c^H \underline{A}_c$ and $\underline{w}_c(s) = \underline{D}_c^H \underline{n}_c(s)$,
$\underline{R}_{nn,c} = E\{\underline{n}_c(s) \underline{n}_c^H(s)\}$ is the covariance of $\underline{n}_c(s)$, and
$\underline{R}_{ww,c} = \underline{D}_c^H \underline{R}_{nn,c} \underline{D}_c$ is the covariance of $\underline{w}_c(s)$.

The SINR of the l-th element of $\hat{\underline{b}}_c(s)$, $\hat{b}_{l,c}(s)$, may be expressed as:

$$SINR\{b_{l,c}(s)\} = \frac{|L_c(\ell, \ell)|^2}{R_{ww,c}(\ell, \ell) + \sum_{i=1, i \neq \ell}^{L} |L_c(\ell, i)|^2}, \quad \text{Eq (37)}$$

where
$L_c(l,i)$ is the (l,i)-th element of $\underline{L}_c$, and
$R_{ww,c}(l,l)$ is the (l,l)-th element of $\underline{R}_{ww,c}$.

SINR $\{b_{l,c}(s)\}$ is the SINR of the l-th data stream sent with channelization code c and may be used to select a data rate for that data stream. The SINR for each channelization code c is dependent on transmit matrix $\underline{B}_c$ used for that channelization code. Receiver 150 may determine the SINR for different possible transmit matrices and select the transmit matrix with the highest SINR. Receiver 150 may send feedback information to transmitter 110. This feedback information may comprise the transmit matrix selected for each channelization code, the SINR or data rate for each channelization code, an average SINR or data rate for all channelization codes, etc.

Transmitter 110 may send L encoded frames or data streams to receiver 150 using any of the MIMO modes shown in Table 1. Receiver 150 may perform linear MIMO detection in two stages—front-end filtering in one stage and combining in another stage, as described above. Receiver 150 may obtain detected symbols for all L frames from the linear MIMO detection and may process these detected symbols to recover the L frames.

Receiver 150 may also perform MIMO detection with SIC. In this case, receiver 150 may perform linear MIMO detection and then process the detected symbols to recover one frame. If the frame is decoded correctly, then receiver 150 may estimate and cancel the interference due to this frame. Receiver 150 may then repeat the same processing for the next frame. Each frame that is recovered later may experience less interference and hence observe higher SINR.

For SIC, the L frames sent simultaneously in a MIMO transmission may achieve different SINRs. The SINR of each frame may be dependent on (i) the SINR of that frame with linear MIMO detection and (ii) the particular order in which the L frames are recovered. A channel quality indicator (CQI) may be determined for each frame based on the SINR achieved by that frame. The CQIs for the L frames may be computed by taking into account the fact that the frame recovered first will not benefit from SIC whereas each frame recovered later may benefit from SIC.

Receiver 150 may perform the following tasks for MIMO detection with SIC:

1. Continually estimate the supportable date rates for the L frames and generate and send appropriate CQI reports, and
2. When receiver 150 is scheduled for data transmission and multiple frames are sent simultaneously, perform MIMO detection with cancellation of each frame decoded correctly.

The two tasks described above may assume a particular traffic-to-pilot ratio $G_c G_p^{-1}$ that is applicable to receiver 150 when scheduled for data transmission. This traffic-to-pilot ratio may be used to derive the combiner matrices and to estimate SINRs. For simplicity, the following description assumes that each frame is sent with one column of the M×L transmit matrix $B_c$.

In one design, receiver 150 may perform full SIC, which is estimation and cancellation of interference across all or much of the time span of the front-end filter. For full SIC, receiver 150 may correctly decode frame 1 first and may then estimate the interference due to frame 1 by encoding, modulating, spreading and scrambling decoded frame 1 in the same manner performed by transmitter 110 to obtain output chips transmitted for frame 1. Receiver 150 may then convolve the output chips with the channel response matrix to estimate the interference due to frame 1, as follows:

$$\underline{i}_1(k) = \hat{\underline{H}} \underline{y}_1(k), \qquad \text{Eq (38)}$$

where $\underline{y}_1(k)$ is a T×1 vector of output chips for frame 1, $\hat{\underline{H}}$ is an R×T channel estimate matrix, which is an estimate of $\underline{H}$, and $\underline{i}_1(k)$ is an R×1 vector of interference due to frame 1.

Receiver 150 may then cancel the interference due to frame 1, as follows:

$$\underline{x}_1(k) = \underline{x}(k) - \underline{i}_1(k), \qquad \text{Eq (39)}$$

where $\underline{x}_1(k)$ is an R×1 vector of input samples, which are estimates of the received samples with frame 1 not transmitted.

Receiver 150 may then process the input samples $\underline{x}_1(k)$ in the same manner as the received samples $\underline{x}(k)$ to recover another frame 2. For frame 2, receiver 150 may re-compute the front-end filter F or $W_p$ based on the input samples $\underline{x}_1(k)$ and may then filter the input samples with the new front-end filter to obtain filtered symbols. Receiver 150 may also re-compute the combiner matrix $\underline{A}_c$ or $\underline{D}_c$ for each channelization code c and then combine the filtered symbols with the new combiner matrix to obtain detected symbols for channelization code c for frame 2.

For full SIC, each frame is associated with a front-end filter and a set of combiner matrices, which may be derived specifically for that frame. The particular order in which the L frames are recovered may impact the front-end filter and the combiner matrices for each frame. For example, if two frames 1 and 2 are sent, then the front-end filter and the combiner matrices for each frame may be different dependent on whether frame 1 is recovered before frame 2, or vice versa. Furthermore, the choice of transmit matrix $B_c$ is also relevant. The front-end filter computed after interference cancellation may be different for different transmit matrices due to changed signal statistics.

For CQI reporting, it is desirable to estimate the SINRs of the L frames to reflect any gains resulting from interference cancellation. The SINR of each frame with linear MIMO detection may be estimated based on pilot symbols and an assumption on the traffic-to-pilot ratio. The SINR estimate may be relatively accurate for the frame recovered first, which does not benefit from SIC. However, the SINR estimate for each frame recovered later may not be accurate since the benefits of SIC may be ascertained only when interference cancellation actually occurs, which may be performed only when receiver 150 is scheduled for data transmission. Receiver 150 may continually estimate SINR and report CQI whereas data transmission may occur sporadically. Thus, it is desirable to estimate SINR as accurately as possible even when data transmission has not occurred.

Receiver 150 may estimate the SINRs of the L frames in various manners. In a first design, receiver 150 may estimate the SINR of each frame through parametric computation of the front-end filter and assuming full cancellation of each recovered frame. In a second design, receiver 150 may estimate the SINR of each frame by canceling only known components of the received signals, e.g., the pilot. This design may provide a lower bound on the achievable SINRs. In a third design, receiver 150 may estimate the SINR of each frame by canceling only on-time signal components of prior recovered frames, if any, as described below. Receiver 150 may perform full cancellation when a data transmission is received. The third design may provide a higher lower bound on the achievable SINRs than the second design.

In another design, receiver 150 may perform on-time SIC, which is estimation and cancellation of interference due to on-time signal components of each recovered frame. For on-time SIC, receiver 150 may correctly decode frame 1 first and may then estimate the interference due to frame 1 by encoding and modulating decoded frame 1 to obtain reconstructed data symbols for frame 1. Receiver 150 may then estimate the interference due to frame 1 based on the reconstructed data symbols. Receiver 150 may subtract the estimated interference from the filtered symbols and then process the resultant symbols to obtain detected symbols for another frame 2.

For on-time SIC, receiver 150 may filter the received samples with the front-end filter just once to obtain filtered symbols for all L frames. Receiver 150 may perform interference cancellation on the filtered symbols (instead of the received samples), which may greatly simplify receiver processing. For each subsequent frame, receiver 150 may re-compute the combiner matrix $\underline{A}_c$ or $\underline{D}_c$ for each channelization code c based on the filtered symbols and the reconstructed data symbols for the frame just decoded.

For simplicity, the following description assumes that two frames are sent simultaneously in a MIMO transmission. The discussion may be extended to any number of frames. Receiver 150 may first recover frame 1 as described above. For frame 2, the symbols available to recover frame 2 may be expressed as:

$$\tilde{\underline{z}}_c(s) = \begin{bmatrix} \underline{z}_c(s) \\ \tilde{b}_{c,1}(s) \end{bmatrix}, \qquad \text{Eq (40)}$$

where $\tilde{b}_{c,1}(s)$ is a reconstructed data symbol for decoded frame 1, and $\tilde{\underline{z}}_c(s)$ is an (M+1)×1 vector of symbols available to recover frame 2.

A combiner vector for frame 2 may be derived based on MMSE criterion, as follows:

$$\underline{d}_{c,2} = [E\{\tilde{\underline{z}}_c(s)\tilde{\underline{z}}_c^H(s)\}]^{-1} E\{\tilde{\underline{z}}_c(s) b_{c,2}^*(s)\}, \qquad \text{Eq (41)}$$

where $\underline{d}_{c,2}(s)$ is an $(M+1) \times 1$ combiner vector for frame 2. A combiner vector may be considered as a combiner matrix with one column.

If two frames are sent simultaneously, then $\underline{A}_c = [\underline{a}_{c,1} \ \underline{a}_{c,2}]$. The combiner vector for frame 2 may then be derived as follows:

$$\underline{d}_{c,2} = \begin{bmatrix} E\{\underline{z}_c(s)\underline{z}_c^H(s)\} & \underline{a}_{c,1} \\ \underline{a}_{c,1}^H & 1 \end{bmatrix}^{-1} \begin{bmatrix} \underline{a}_{c,2} \\ 0 \end{bmatrix}. \quad \text{Eq (42)}$$

Most of the terms in equation (42) may be available from the processing of frame 1. In particular, $E\{\underline{z}_c(s)\underline{z}_c^H(s)\}$ may be obtained as shown in equation (32). $\underline{a}_{c,2}$ may be obtained from the second column of $\underline{A}_c$, which may be derived as shown in equation (27). $\underline{a}_{c,1}$ may be obtained from the first column of $\underline{A}_c$. However, since the reconstructed data symbols for frame 1 are available, an improved $\underline{a}_{c,1}$ may be obtained as follows:

$$\underline{a}_{c,1} = E\left\{\frac{1}{C} \cdot \sum_{c=1}^{C} \underline{z}_c(s) \vec{b}_{c,1}^*(s)\right\}. \quad \text{Eq (43)}$$

The detected symbols $\hat{b}_{c,2}(s)$ for frame 2 may then be obtained as follows:

$$\hat{b}_{c,2}(s) = \underline{d}_{c,2}^H \underline{z}_c(s). \quad \text{Eq (44)}$$

Equation (44) combines the filtered symbols and the reconstructed data symbols for frame 1 based on combiner vector $\underline{d}_{c,2}(s)$ to obtain the detected symbols for frame 2. Equation (44) essentially performs interference estimation and cancellation as well as linear MIMO detection. Equation (44) may be decomposed as follows.

The interference due to frame 1 may be estimated as follows:

$$i_{c,1}(s) = -d_{c,M+1} \overline{b}_{c,1}(s), \quad \text{Eq (45)}$$

where $d_{c,M+1}$ is a scalar/weight for estimating the interference due to decoded frame 1, and $i_{c,1}(s)$ is the on-time interference due to frame 1.

$d_{c,M+1}$ is the last element of combiner vector $\underline{d}_{c,2}(s)$ and is derived based on the filtered symbols as well as the reconstructed data symbols for frame 1.

The MIMO detection for frame 2 may be expressed as follows:

$$\check{b}_{c,2}(s) = \check{\underline{d}}_{c,2}^H \underline{z}_c(s), \quad \text{Eq (46)}$$

where $\check{\underline{d}}_{c,2}(s)$ is an $M \times 1$ vector containing the first M elements of combiner vector $\underline{d}_{c,2}(s)$, and $\check{b}_{c,2}(s)$ is a symbol obtained for frame 2.

The detected symbols $\hat{b}_{c,2}(s)$ for frame 2 may then be obtained as follows:

$$\hat{b}_{c,2}(s) = \check{b}_{c,2}(s) - i_{c,1}(s). \quad \text{Eq (47)}$$

For on-time SIC, only the on-time signal components are affected by the interference cancellation, and the multipath characteristics of the received samples after interference cancellation remain unchanged. This means that the same front-end filter F or $\underline{W}_p$ may be used for each frame, and all of the changes to the optimal filter $\underline{W}_c$ may be incorporated in the combiner matrix. Only the combiner matrix $\underline{A}_c$ or $\underline{D}_c$ operating on the on-time symbol is impacted by the interference cancellation. This is true regardless of the transmit matrix $\underline{B}_c$ and the order in which the L frames are recovered. The combiner matrix $\underline{A}_c$ or $\underline{D}_c$ may be re-computed for each channelization code of each frame and used to combine the filtered symbols for that channelization code of that frame.

For CQI reporting, it is desirable to be able to estimate the SINR achieved by each later recovered frame using parametric techniques that do not involve actual decoding and cancellation of each earlier recovered frame. This is because frames are not sent to receiver 150 unless the receiver is scheduled for data transmission. For SINR estimation, the SINR of each frame may be estimated by setting the column of $\underline{B}_c$ for each recovered frame to zero. For example, if two frames are sent, then the SINR of the first recovered frame 1 may be computed using $\underline{B}_c = [\underline{b}_1 \ \underline{b}_2]$, e.g., as shown in equations (36) and (37). The SINR of the second recovered frame 2 may be computed using $\underline{B}_{c,2} = [0 \underline{b}_2]$, which is a transmit matrix that reflects the hypothetical cancellation of frame 1.

The SINR estimation technique described above may allow receiver 150 to easily estimate interference cancellation gains for different transmit matrices $\underline{B}_c$ and/or different orders of recovering the L frames. For example, receiver 150 may estimate the SINR of frame 1 recovered first (using $\underline{B}_c = [\underline{b}_1 \ \underline{b}_2]$) and the SINR of frame 2 recovered second (using $\underline{B}_{c,2} = [0 \ \underline{b}_2]$), which reflects cancellation of the interference from frame 1. Receiver 150 may also estimate the SINR of frame 2 recovered first (using $\underline{B}_c = [\underline{b}_1 \ \underline{b}_2]$) and the SINR of frame 1 recovered second (using $\underline{B}_{c,1} = [\underline{b}_1 \ 0]$), which reflects cancellation of the interference from frame 2. Receiver 150 may also evaluate different transmit matrices that can be used for data transmission. Receiver 150 may determine a specific transmit matrix and a specific recovery order that result in the best performance, e.g., in terms of overall throughput or data rate for all L frames. Receiver 150 may send this information to transmitter 110 to assist with data transmission to the receiver.

Because the front-end filter is constant with on-time SIC, robust SINR estimation may be possible even when receiver 150 is not scheduled for data transmission. The SINR of each frame may be estimated by simply re-computing the combiner matrix $\underline{D}_c$ based on the transmit matrix for that frame. Since the computational burden may be low, it may be practical to evaluate different transmit matrices and recovery orders to determine the transmit matrix and/or different recovery order that result in the best performance.

The estimation of the SINR of each later recovered frame based on on-time SIC may render the performance metric of the last recovered frame only linearly dependent on the transmit power allocated to the channelization codes used for data transmission. This is due to the facts that (i) the statistical properties of the multipath interference remain the same independent of the channelization code and power allocation, assuming that the same total power is used, and (ii) all of the on-time interference contributions vanish. Part (ii) is true because (a) the interference due to each recovered frame on the same channelization codes is cancelled and (b) the interference from other channelization codes is suppressed because of the orthogonality of the channelization codes when time aligned. This linear dependence of the performance metric on the allocated transmit power may allow transmitter 110 to scale the SINRs reported by receiver 150 by the actual transmit power used for a frame if the power assumed for SINR estimation is different from the power used for data transmission.

On-time SIC may provide improved performance over no interference cancellation. Furthermore, on-time SIC may be much less computationally intensive than full SIC. On-time SIC may also allow for consistent SINR estimation, which may improve performance.

Figure 4:
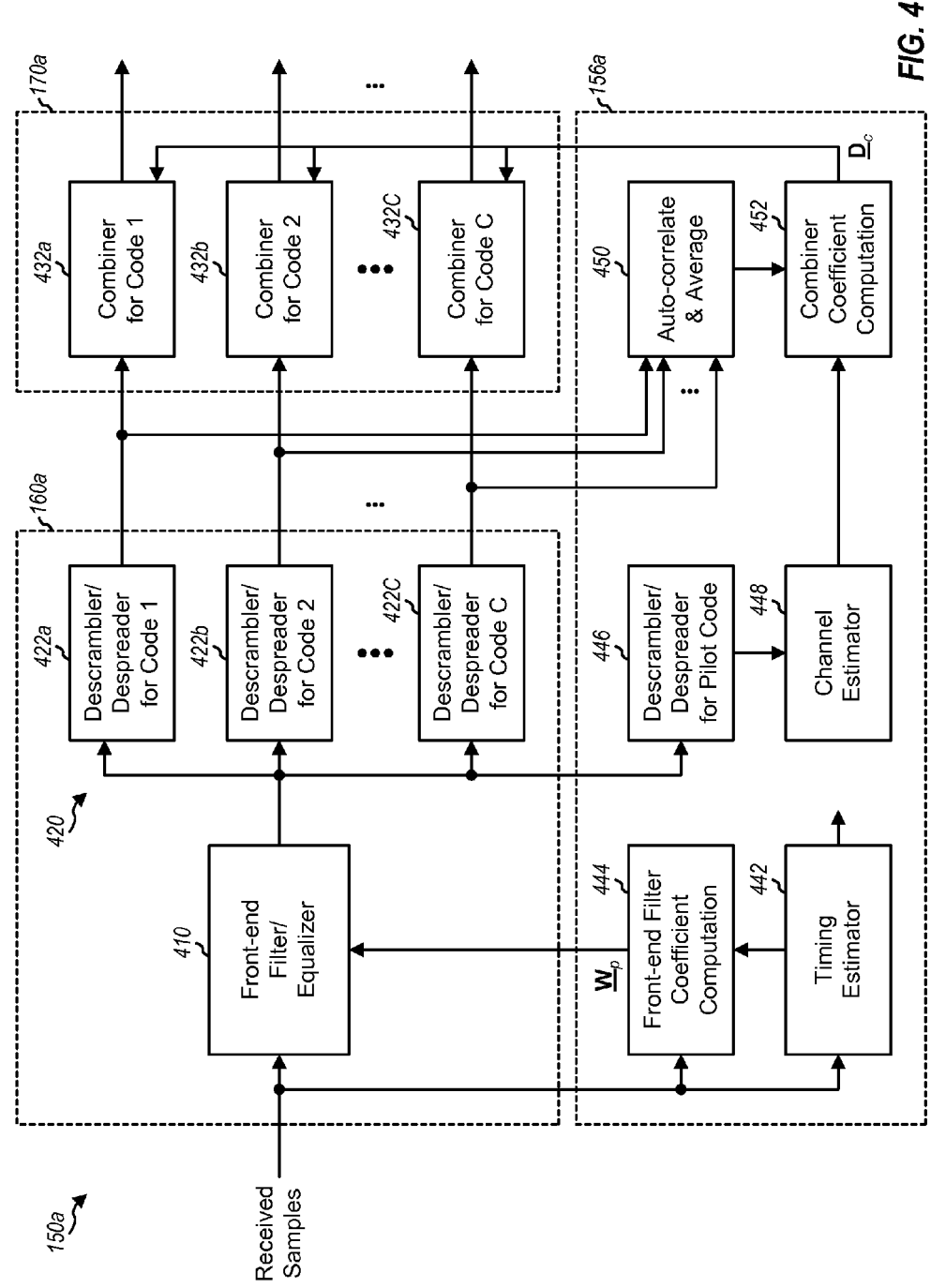
FIG. 4 shows a design of the receiver without SIC.

FIG. 4 shows a block diagram of a receiver 150a, which is one design of receiver 150 in FIG. 1. In this design, front-end filtering is performed prior to CDMA demodulation. An equalizer/CDMA demodulator 160a, which is one design of block 160 in FIG. 1, includes a front-end filter/equalizer 410 and a CDMA demodulator 420. CDMA demodulator 420 includes C descramblers/despreaders 422a through 422C for up to C channelization codes used for traffic data. An RX MIMO processor 170a, which is one design of block 170 in FIG. 1, includes C combiners 432a through 432C for up to C channelization codes used for traffic data.

Within a channel processor 156a, which is one design of block 156 in FIG. 1, a timing estimator 442 determines the timing of the received signals. Unit 442 may estimate channel impulse responses and/or power delay profiles for different antennas and may determine the center of gravity of the channel impulse responses and/or power delay profiles. Unit 442 may then determine the timing of the received signals based on the center of gravity.

A coefficient computation unit 444 derives coefficients for filter $W_p$ based on the received samples, e.g., as shown in equation (20). Unit 444 may also derive $W_p$ based on RLS, block least squares, or some other technique. The timing information from unit 442 may be used for training, e.g., to align the locally generated pilot chips with the received samples. Unit 444 provides $W_p$ to front-end filter 410.

Filter 410 performs front-end filtering/equalization on the received samples x(k) with $W_p$ and provides filtered samples. Within CDMA demodulator 420, each unit 422 despreads and descrambles the filtered samples for a different channelization code and provides filtered symbols $\underline{z}_c(s)$ for that channelization code.

A unit 446 despreads and descrambles the filtered samples for pilot channelization code p. Units 422 and 446 perform despreading and descrambling based on the timing provided by unit 442. A channel estimator 448 estimates an M×M matrix $W_p^H \tilde{H}$ based on the filtered pilot symbols from unit 446. A unit 450 computes the outer product $\underline{z}_c(s)\underline{z}_c^H(s)$ for each channelization code, averages the outer product across channelization codes and symbol periods, and provides correlation matrix $\underline{R}_{zz}$, e.g., as shown in equation (32). A unit 452 derives the coefficients for combiner matrix $\underline{D}_c$ for each channelization code c based on matrix $W_p^H \tilde{H}$ from unit 448, the correlation matrix $\underline{R}_{zz}$ from unit 450, and code-specific matrices, as follows:

$$\underline{D}_c = \underline{R}_{zz}^{-1} W_p^H \tilde{H} \underline{G}_c \underline{B}_c. \quad \text{Eq (48)}$$

Within RX MIMO processor 170a, each combiner 432 combines the filtered symbols for a different channelization code c based on combiner matrix $\underline{D}_c$ and provides detected symbols for that channelization code.

In general, front-end filtering may be performed in the first stage to process non on-time signal components in the M received signals. The front-end filter is, in general, not dependent on how the signals are processed at the transmitter prior to transmission. For a CDM transmission, the front-end filter may be applicable for all channelization codes. The second stage may combine the on-time signal components to recover the L transmitted signals. The combiner matrices used in the second stage may be dependent on how the signals are processed prior to transmission (e.g., the transmit matrix $\underline{B}_c$ and gain matrix $\underline{G}_c$ used by the transmitter) and other factors (e.g., the channel response $\tilde{H}$ and signal statistics $\underline{R}_{zz}$).

Figure 5A:
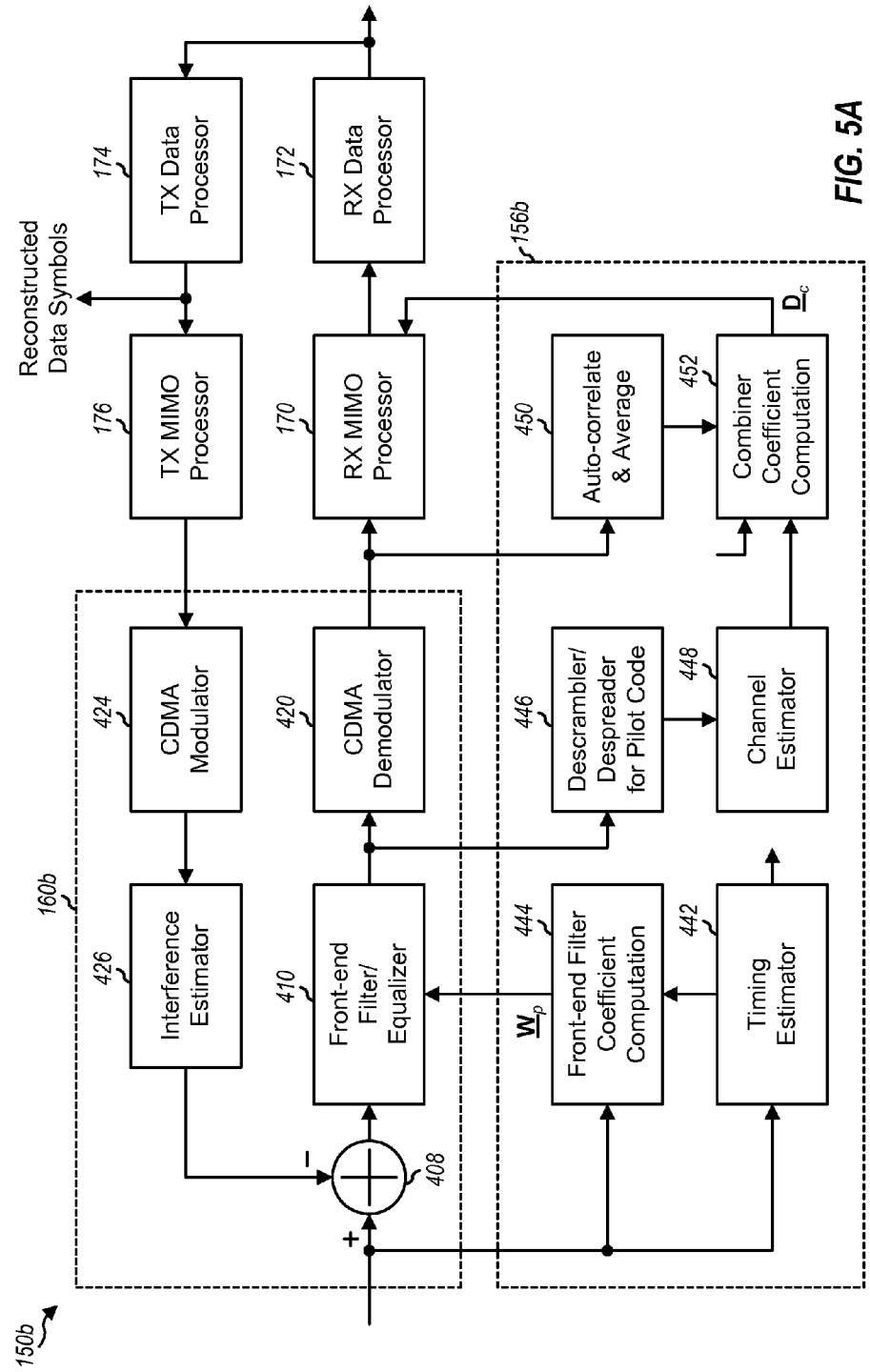
FIG. 5A shows a design of the receiver with full SIC.

FIG. 5A shows a block diagram of a receiver 150b, which performs full SIC and is another design of receiver 150 in FIG. 1. In this design, front-end filtering is performed prior to CDMA demodulation. An equalizer/CDMA demodulator 160b, which is another design of block 160 in FIG. 1, includes a summer 408, front-end filter/equalizer 410, CDMA demodulator 420, a CDMA modulator 424, and an interference estimator 426. For the first frame, summer 408 simply passes the received samples to front-end filter 410. For each subsequent frame, an interference estimator 426 provides the interference due to a frame just recovered, and summer 408 subtracts the interference from the received samples, e.g., as shown in equation (39), and provides input samples to front-end filter 410. Filter 410 performs front-end filtering/equalization on the received samples or the input samples with $W_p$ and provides filtered samples. CDMA demodulator 420 despreads and descrambles the filtered samples for all channelization codes and provides filtered symbols for these channelization codes.

Within a channel processor 156b, which is another design of block 156 in FIG. 1, units 442 through 450 operate as described above for FIG. 4. For each frame, unit 450 may compute the outer product $\underline{z}_c(s)\underline{z}_c^H(s)$ of the filtered symbols from CDMA demodulator 420 for each channelization code, average the outer product across channelization codes and symbol periods, and provide correlation matrix $\underline{R}_{zz}$, e.g., as shown in equation (32). For the first frame, unit 452 may derive the coefficients for combiner matrix $\underline{D}_c$ for each channelization code c as described above for FIG. 4. For each subsequent frame, unit 452 may derive the coefficients for combiner matrix $\underline{D}_c$ based on the filtered samples for that frame.

Within RX MIMO processor 170, which may be implemented as shown in FIG. 4, the combiner for each channelization code c may combine the filtered symbols for that channelization code based on combiner matrix $\underline{D}_c$ and provide detected symbols for the channelization code. RX data processor 172 may demodulate and decode the detected symbols for the frame being recovered and provide decoded data. If the frame is decoded correctly, then a TX data processor 174 may encode and modulate the decoded frame and provide reconstructed data symbols for the frame. A TX MIMO processor 176 may process the reconstructed data symbols to obtain output symbols. CDMA modulator 424 may then spread and scramble the output symbols to obtain output chips for the decoded frame. Interference estimator 426 may estimate the interference due to the decoded frame, e.g., as shown in equation (38), and provide the estimated interference.

For full SIC, channel processor 156b may derive a front-end filter for each frame, and interference estimator 424 may estimate the interference for an entire time span of the front-end filter. Channel processor 156b may derive a combiner matrix for each channelization code for each frame.

Figure 5B:
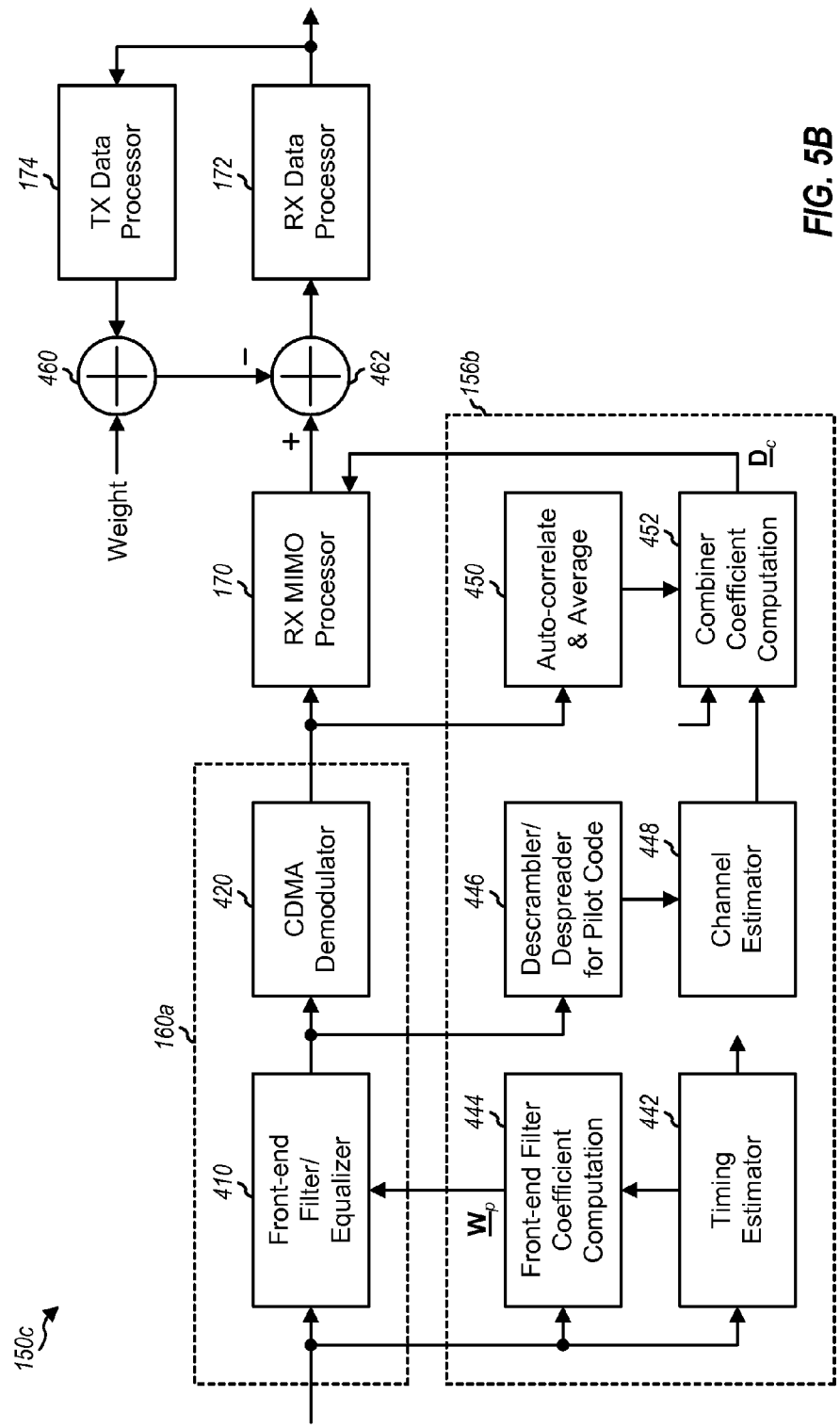
FIG. 5B shows a design of the receiver with on-time SIC.

FIG. 5B shows a block diagram of a receiver 150c, which performs on-time SIC and is yet another design of receiver 150 in FIG. 1. In this design, front-end filtering is performed prior to CDMA demodulation. Equalizer/CDMA demodulator 160a may process the received samples and provide filtered symbols for each channelization code c, as described above for FIG. 4. RX MIMO processor 170 may combine the filtered symbols for each channelization code c based on combiner matrix $\underline{D}_c$ or $\underline{d}_{c,2}$ and provide detected symbols for the channelization code. RX data processor 172 may demodulate and decode the detected symbols for the frame being recovered and provide decoded data. If the frame is decoded correctly, then TX data processor 174 may encode and modulate the decoded frame and provide reconstructed data symbols for the frame. A multiplier 460 may scale the reconstructed data symbols with a scalar/weight to obtain an estimate of the interference due to the decoded frame, e.g., as shown in equation (45). A summer 462 may subtract the output of multiplier 460 from the output of RX MIMO processor 170 for interference cancellation, e.g., as shown in equation (47), and may then provide the detected symbols for the next frame to be recovered. The interference estimation and cancellation may also be performed within or prior to RX MIMO processor 170.

For on-time SIC, channel processor 156b may derive a single front-end filter for all L frames, and multiplier 460 may estimate the interference for only the on-time signal components of each decoded frame. Channel processor 156b may derive a combiner matrix for each channelization code for each frame.

Figure 5C:
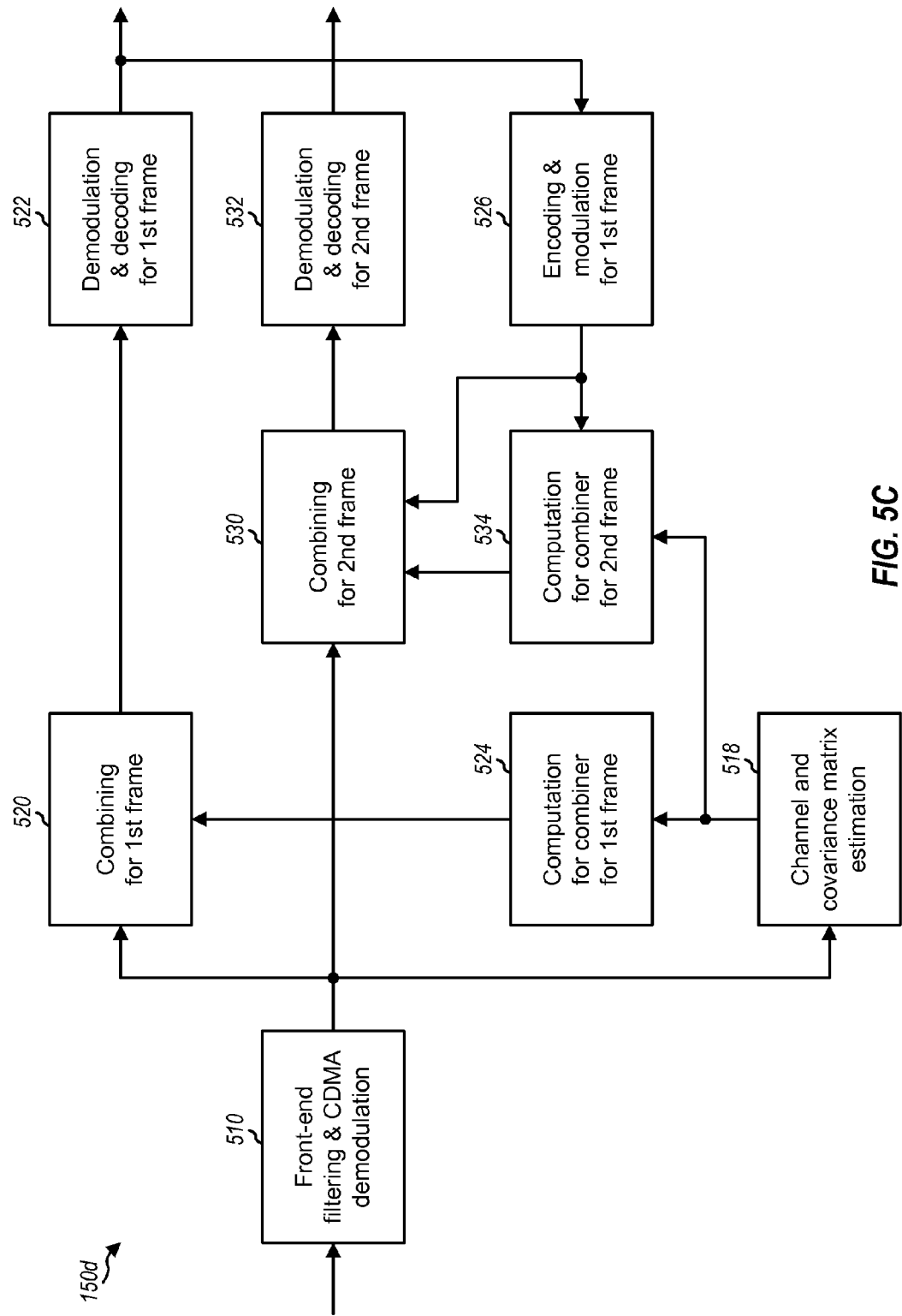
FIG. 5C shows another design of the receiver with on-time SIC.

FIG. 5C shows a block diagram of a receiver 150d, which performs on-time SIC for a MIMO transmission of two frames and is yet another design of receiver 150 in FIG. 1. Front-end filtering and CDMA demodulation may be performed on the received samples to obtain filtered symbols for each channelization code (block 510). Block 510 may include blocks 410, 420 and 446 in FIG. 5B. The blocks used to derive the front-end filter (e.g., blocks 442 and 444 in FIG. 5B) are not shown in FIG. 5C for clarity. The channel response $\tilde{H}$ and covariance matrix $R_{zz}$ may be estimated based on the filtered symbols (block 518). Block 518 may include blocks 448 and 450 in FIG. 5B. A combiner matrix $D_c$ for the first frame may be computed based the channel response, the covariance matrix, and other parameters, e.g., as shown in equation (48) (block 524). The filtered symbols may be combined based on the combiner matrix $D_c$ to obtain detected symbols for the first frame, e.g., as shown in equation (29) (block 520). The detected symbols for the first frame may be demodulated and decoded to obtain decoded data for the first frame (block 522).

If the first frame is decoded correctly, which may be determined based on a CRC check, then the decoded first frame may be encoded and modulated to obtain reconstructed data symbols for the first frame (block 526). A combiner matrix $d_{c,2}$ for the second frame may be computed based on the covariance matrix, the reconstructed data symbols for the first frame, and other parameters, e.g., as shown in equation (42) (block 534). Block 534 may derive an improved estimate of $a_{c,1}$ based on the reconstructed data symbols for the first frame, as shown in equation (43). The filtered symbols and the reconstructed data symbols for the first frame may be combined based on the combiner matrix $d_{c,2}$ to obtain detected symbols for the second frame, e.g., as shown in equation (44) (block 530). The detected symbols for the second frame may be demodulated and decoded to obtain decoded data for the second frame (block 532). The processing shown in FIG. 5C may be extended for any number of frames.

Figure 6:
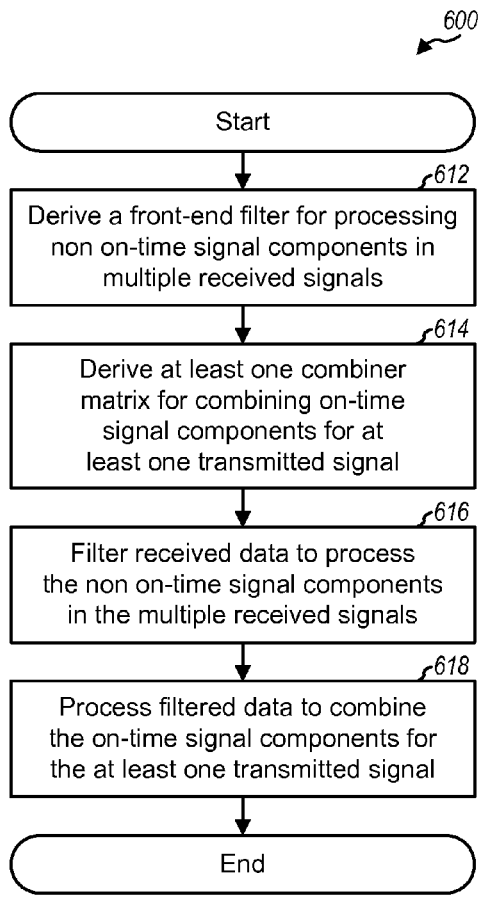
FIG. 6 shows a process for recovering a MIMO transmission without SIC.

FIG. 6 shows a design of a process 600 for recovering a MIMO transmission without SIC. A front-end filter for processing (e.g., compensating for, suppressing, or mitigating) non on-time signal components in multiple received signals is derived (block 612). The front-end filter does not isolate the non on-time signal components. Instead, the front-end filter processes the non on-time signal components in a desirable/beneficial manner and may also (incidentally) process on-time signal components. At least one combiner matrix for combining on-time signal components for multiple transmitted signals is also derived (block 614). The front-end filter may be F derived as shown in equation (21), and the combiner matrices may be $A_c$ derived as shown in equation (23). The front-end filter may also be $W_p$ derived as shown in equation (19 or (20), and the combiner matrices may be $D_c$ derived, e.g., as shown in equation (30), (33) or (48). The front-end filter and combiner matrices may also be derived in other manners. The front-end filter may be derived based on received data for pilot and in accordance with, e.g., least squares criterion. The combiner matrices may be derived based on the transmit matrices used to send data, the gains used for data, a channel response estimate, the front-end filter, signal and/or noise statistics, etc. The combiner matrices may also be derived in accordance with MMSE or some other criterion.

Received data is filtered to process the non on-time signal components in the multiple received signals (block 616). Filtered data is processed to combine the on-time signal components for the multiple transmitted signals (block 618). Received data for more than one symbol period may be filtered to process the non on-time signal components. Filtered data for one symbol period may be processed to combine the on-time signal components. The received data and filtered data may be given in samples, symbols, etc.

For a CDM transmission sent with multiple channelization codes, a single front-end filter may be derived and used to process the non on-time signal components, and multiple combiner matrices may be derived and used to combine the on-time signal components for the multiple channelization codes. In one scheme, the received data is first filtered with the front-end filter to obtain intermediate data. The intermediate data is then despread for each channelization code to obtain filtered data for the channelization code. The filtered data for each channelization code is further processed with a combiner matrix for that channelization code to obtain output data for the channelization code. In another scheme, the received data is first despread for each channelization code to obtain despread data for the channelization code. The despread data for each channelization code is then filtered with the same front-end filter to obtain filtered data for the channelization code. The filtered data for each channelization code is further processed with a combiner matrix for the channelization code to obtain output data for the channelization code.

For CDM, the front-end filter may be derived based on the received data and known pilot, e.g., based on (a) samples for the received data and known pilot chips for chip level training or (b) despread pilot symbols obtained from the received data and known pilot symbols for symbol level training. The combiner matrices may be derived based on the transmit matrices used for the multiple channelization codes, the gains for the multiple channelization codes, a channel response estimate, the front-end filter, signal and/or noise statistics, etc., or a combination thereof. The front-end filter and channel response estimate may be estimated jointly, e.g., as $W_p^H \tilde{H}$.

Figure 7:
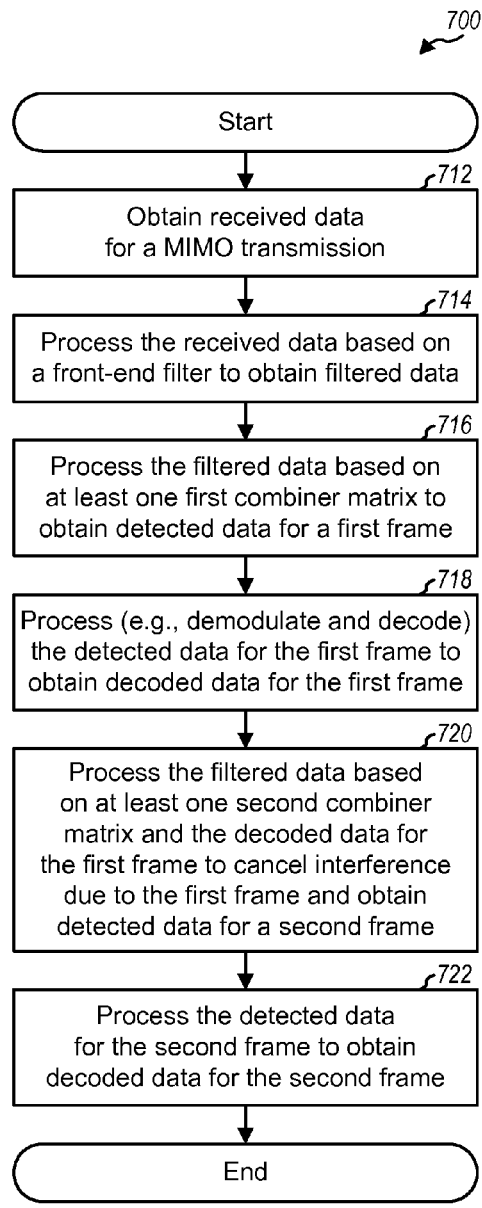
FIG. 7 shows a process for recovering a MIMO transmission with SIC.

FIG. 7 shows a design of a process 700 for recovering a MIMO transmission with on-time SIC. Received data for a MIMO transmission may be obtained (block 712). The received data may be processed based on a front-end filter to obtain filtered data (block 714). The filtered data may be further processed based on at least one first combiner matrix to obtain detected data for a first frame (block 716). The detected data for the first frame may be processed (e.g., demodulated and decoded) to obtain decoded data for the first frame (block 718). The filtered data may also be processed based on at least one second combiner matrix and the decoded data for the first frame to cancel interference due to the first frame and obtain detected data for a second frame (block 720). For block 720, the interference due to the first frame may be estimated and canceled (e.g., at symbol level instead of sample level) from the filtered data only if the first frame is decoded correctly. The detected data for the second frame may be processed to obtain decoded data for the second frame (block 722).

The front-end filter may process non on-time signal components in the received data to obtain filtered data. Each combiner matrix may combine on-time signal components in the filtered data for a respective channelization code to obtain detected data for the channelization code. The front-end filter may be derived based on the received data and known pilot data. The first and second frames may be sent using at least one channelization code. A first combiner matrix may be derived for each channelization code based on the filtered data, a transmit matrix for the channelization code, a gain for the channelization code, the front-end filter, a channel response estimate, etc., or any combination thereof. A second combiner matrix may be derived for each channelization code based on the filtered data, the decoded data for the first frame, the transmit matrix for the channelization code, etc., or any combination thereof.

For on-time SIC, interference due to on-time signal components of the first frame may be estimated and canceled from the filtered data. The same front-end filter may be used to process the received data for all frames. For full SIC, interference due to the first frame for all or most of the time span of the front-end filter may be estimated and canceled from the received data to obtain the input data. The front-end filter may be updated for the second frame and used to process the input data.

Received signal quality (e.g., SINR) of the first frame may be estimated based on (i) the transmit matrix for the first and second frames and (ii) an assumption of no cancellation of interference from any frame. The received signal quality of the second frame may be estimated based on (i) a modified transmit matrix having a column corresponding to the first frame set to zero and (ii) an assumption of cancellation of interference due to the on-time signal components of the first frame. The received signal qualities of the first and second frames may be estimated based further on the front-end filter, the at least one first combiner matrix, the at least one second combiner matrix, at least one gain for the at least one channelization code used for the first and second frames, the channel response estimate, or any combination thereof.

Prior to the MIMO transmission, received signal qualities of multiple frames may be estimated for at least one transmit matrix and at least one recovery order for the multiple frames, e.g., based on an assumption that the on-time signal components of each earlier recovered frame will be canceled. A transmit matrix and/or a recovery order with the highest performance may be selected. Feedback information comprising the selected transmit matrix and/or the selected recovery order may be sent to a transmitter. The transmitter may use the feedback information to send a MIMO transmission to the receiver.

The multi-stage receiver described herein may also be used for other communication systems. For example, in a time division multiplexed (TDM) system, a front-end filter may be derived based on pilot received in a first time interval, and a combiner matrix for a second time interval may be derived based on a transmit matrix used in the second time interval. Data received in the second time interval may be filtered with the front-end filter, and the filtered data may be further processed with the combiner matrix.

In general, a filter may be derived based on pilot, which may be sent on a particular channelization code and/or time interval and using a particular transmit matrix and gain. The filter derived from the pilot may be used to derive a filter for data, which may be sent on other channelization codes and/or time intervals and possibly using different transmit matrices and gains.

For CDMA, the on-time and non on-time signal components may be distinguished by the time at which they are transmitted. The receiver may process a window of samples in order to recover a desired symbol transmitted by the transmitter. The timing of the equalizer determines the time instant at which the desired symbol is transmitted relative to the window. The samples obtained by the receiver contain different additive signal components including on-time and non on-time signal components. The on-time signal components are signal components for the desired symbol as well as other symbols transmitted at the same time as the desired symbol. All other signal components are non on-time signal components, which include signal components tracing back to symbols transmitted before and after the desired symbol.

A symbol may be transmitted by a transmit function, which may be dependent on one or more parameters. For example, the transmit function may be dependent on symbol period s, channelization code c, frequency slot or subcarrier index n, etc., and may be denoted as $f(s,c,n,\ldots)$. For simplicity, the transmit function may be dependent on three parameters s, c and n, or a tuple (s,c,n). The transmit functions for different symbols may be orthogonal so that $<f(s_1,c_1,n_1), f(s_2, c_2, n_2)> \ne 0$ only if $s_1=s_2$, $c_1=c_2$ and $n_1=n_2$, which may be expressed as $(s_1, c_1, n_1)=(s_2, c_2, n_2)$.

A received signal may include (a) desired signal components from a desired transmit function $f(s_1,c_1, n_1)$ defined by tuple $(s_1,c_1,n_1)$ and (b) other signal components from other transmit functions $f(s,c,n)$, with $(s,c,n) \ne (s_1,c_1,n_1)$. The front-end filtering in the first stage would process the other signal components. The combiner in the second stage would process the desired signal components.

For CDM, the transmit functions for symbol period s are determined by channelization codes of length C multiplied by scrambling sequence p(k). The transmit function for symbol period s and channelization code c may be denoted as $f(s,c)$. From the perspective of a symbol transmitted with transmit function $f(s_1,c_1)$, the received signal contains the following:
1. non on-time signal components corresponding to $f(s,c)$ for $s \ne s_1$,
2. on-time signal components corresponding to $f(s_1,c)$ and composed of:
   a. on-time signal components from the desired channelization code and corresponding to $f(s_1, c_1)$, and
   b. on-time signal components from other channelization codes and corresponding to $f(s_1,c_2)$ for $c_1 \ne c_2$.

The front-end filter processes the non on-time signal components corresponding to $f(s,c)$. The descrambling and despreading by the front-end filter also cancels the on-time signal components from other channelization codes and corresponding to $f(s_1,c_2)$. The combiner processes the on-time signal components from the desired channelization code and corresponding to $f(s_1,c_1)$.

In a single carrier system that does not utilize CDM, the transmit functions may be simply digital deltas in time and may be given as $f(s)=\delta(t-s)$. As time t advances, the position of the delta changes in time.

In an OFDM-based system, the transmit functions may be for different subcarriers and may be given as $f(s,n)$, where n is a subcarrier index. The subcarriers in OFDM may correspond to the channelization codes in CDM. A transmitter may send N data/pilot symbols on N subcarriers in an OFDM symbol period from a given transmit antenna by (a) converting the N data/pilot symbols to the time-domain with an inverse fast Fourier transform (IFFT) to obtain N time-domain samples and (b) appending a cyclic prefix to the time-domain samples to obtain an OFDM symbol. A receiver may obtain received data/pilot symbols for a given receive antenna by (a) removing the cyclic prefix in the received samples and (b) converting N received samples to the frequency-domain with a fast Fourier transform (FFT) to obtain N received symbols for the N subcarriers. The received symbols may correspond to $z_c(s)$ in equation (40), where subscript c is replaced with subcarrier index n. For OFDM, the on-time signal components may be signal components sent on a particular subcarrier from different transmit antennas. The non on-time signal components may be signal components sent on other subcarriers. The front-end filter may be implemented by the FFT and cyclic prefix removal at the receiver. A combiner matrix $\underline{D}_c$ may be computed for each subcarrier and used to combine received symbols from all received antennas for that subcarrier.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus for communication, comprising:
at least one processor configured to obtain received data for a multiple-input multiple-output (MIMO) transmission, to process the received data based on a front-end filter to obtain filtered data, to process the filtered data based on at least one first combiner matrix to obtain detected data for a first frame, to process the detected data for the first frame to obtain decoded data for the first frame, to determine if the first frame is decoded correctly, and to process the filtered data based on at least one second combiner matrix and the decoded data for the first frame to cancel an interference due to the first frame when the first frame is decoded correctly and obtain detected data for a second frame; and
a memory coupled to the at least one processor.

2. The apparatus of claim 1, wherein the front-end filter processes non on-time signal components in the received data to obtain the filtered data, and wherein each combiner matrix combines on-time signal components in the filtered data for a respective channelization code to obtain detected data for the channelization code.

3. The apparatus of claim 1, wherein the at least one processor derives the front-end filter based on the received data and pilot data.

4. The apparatus of claim 1, wherein the first and second frames are sent with at least one channelization code, and wherein the at least one processor derives a first combiner matrix for each channelization code based on the filtered data.

5. The apparatus of claim 4, wherein the at least one processor derives the first combiner matrix for each channelization code based further on at least one of a transmit matrix used for the channelization code, a gain for the channelization code, the front-end filter, and a channel response estimate.

6. The apparatus of claim 4, wherein the at least one processor derives a second combiner matrix for each channelization code based on the filtered data.

7. The apparatus of claim 6, wherein the at least one processor derives the second combiner matrix for each channelization code based further on the decoded data for the first frame.

8. The apparatus of claim 6, wherein the at least one processor derives the second combiner matrix for each channelization code based further on at least one of a transmit matrix used for the channelization code, a gain for the channelization code, the front-end filter, and a channel response estimate.

9. The apparatus of claim 1, wherein the at least one processor estimates an interference due to on-time signal components of the first frame, and
cancels the interference due to on-time signal components of the first frame from the filtered data.

10. The apparatus of claim 1, wherein the at least one processor determines at least one weight for estimating the interference due to the first frame based on the filtered data and the decoded data for the first frame.

11. The apparatus of claim 1, wherein the at least one processor estimates the interference due to the first frame for a time span of the front-end filter, cancels the interference due to the first frame from the received data to obtain input data, updates the front-end filter for the second frame, and processes the input data based on the updated front-end filter to obtain the filtered data for the second frame.

12. The apparatus of claim 1, wherein the at least one processor estimates a received signal quality of the first frame based on no cancellation of interference from any frame, and estimates a received signal quality of the second frame based on cancellation of interference due to on-time signal components of the first frame.

13. The apparatus of claim 1, wherein the at least one processor estimates a received signal quality of the first frame based on a transmit matrix for the first and second frames, and estimates a received signal quality of the second frame based on a modified transmit matrix having a column corresponding to the first frame set to zero.

14. The apparatus of claim 13, wherein the at least one processor estimates the received signal qualities of the first and second frames based further on the front-end filter, the at least one first combiner matrix, the at least one second combiner matrix, at least one gain for at least one channelization code used for the first and second frames, and a channel response estimate.

15. The apparatus of claim 1, wherein the at least one processor estimates received signal qualities of multiple frames for at least one transmit matrix and at least one recovery order for the multiple frames, selects a transmit matrix and a recovery order with highest performance, and sends feedback information comprising the selected transmit matrix and the selected recovery order.

16. A method for communication, comprising:
obtaining received data for a multiple-input multiple-output (MIMO) transmission;
processing the received data based on a front-end filter to obtain filtered data;
processing the filtered data based on at least one first combiner matrix to obtain detected data for a first frame;
processing the detected data for the first frame to obtain decoded data for the first frame;
determining if the first frame is decoded correctly; and
processing the filtered data based on at least one second combiner matrix and the decoded data for the first frame when the first frame is decoded correctly to cancel an interference due to the first frame and obtain detected data for a second frame.

17. The method of claim 16, further comprising:
deriving a first combiner matrix for each of at least one channelization code used for the first and second frames based on the filtered data; and
deriving a second combiner matrix for each channelization code based on the filtered data and the decoded data for the first frame.

18. The method of claim 16, wherein the processing the filtered data based on the at least one second combiner matrix comprises:
estimating an interference due to on-time signal components of the first frame, and
canceling the interference due to on-time signal components of the first frame from the filtered data.

19. The method of claim 16, further comprising:
estimating a received signal quality of the first frame based on no cancellation of interference from any frame; and
estimating a received signal quality of the second frame based on cancellation of interference due to on-time signal components of the first frame.

20. An apparatus for communication, comprising:
means for obtaining received data for a multiple-input multiple-output (MIMO) transmission;
means for processing the received data based on a front-end filter to obtain filtered data;
means for processing the filtered data based on at least one first combiner matrix to obtain detected data for a first frame;
means for processing the detected data for the first frame to obtain decoded data for the first frame;
means for determining if the first frame is decoded correctly; and
means for processing the filtered data based on at least one second combiner matrix and the decoded data for the first frame to cancel an interference due to the first frame when the first frame is decoded correctly and obtain detected data for a second frame.

21. The apparatus of claim 20, further comprising:
means for deriving a first combiner matrix for each of at least one channelization code used for the first and second frames based on the filtered data; and
means for deriving a second combiner matrix for each channelization code based on the filtered data and the decoded data for the first frame.

22. The apparatus of claim 20, wherein the means for processing the filtered data based on the at least one second combiner matrix comprises:
means for estimating an interference due to on-time signal components of the first frame, and
means for canceling the interference due to on-time signal components of the first frame from the filtered data.

23. The apparatus of claim 20, further comprising:
means for estimating a received signal quality of the first frame based on no cancellation of interference from any frame; and
means for estimating a received signal quality of the second frame based on cancellation of interference due to on-time signal components of the first frame.

24. A computer program product comprising:
a non-transitory computer-readable medium comprising:
code for causing a computer to obtain received data for a multiple-input multiple-output (MIMO) transmission;
code for causing the computer to process the received data based on a front-end filter to obtain filtered data;
code for causing the computer to process the filtered data based on at least one first combiner matrix to obtain detected data for a first frame;
code for causing the computer to process the detected data for the first frame to obtain decoded data for the first frame;
code for determining if the first frame is decoded correctly; and
code for causing the computer to process the filtered data based on at least one second combiner matrix and the decoded data for the first frame to cancel an interference due to the first frame when the first frame is decoded correctly and obtain detected data for a second frame.

* * * * *